(12) United States Patent
Nakanishi et al.

(10) Patent No.: US 7,646,452 B2
(45) Date of Patent: Jan. 12, 2010

(54) METHOD OF PRODUCING MICRO-LENS-CARRYING DISPLAY PANEL AND DISPLAY UNIT AND EXPOSURE SYSTEM

(75) Inventors: Hiroshi Nakanishi, Yawata (JP); Kuniaki Okada, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 48 days.

(21) Appl. No.: 10/582,172

(22) PCT Filed: Dec. 8, 2004

(86) PCT No.: PCT/JP2004/018262

§ 371 (c)(1),
(2), (4) Date: Jun. 8, 2006

(87) PCT Pub. No.: WO2005/057274

PCT Pub. Date: Jun. 23, 2005

(65) Prior Publication Data

US 2007/0097293 A1    May 3, 2007

(30) Foreign Application Priority Data

Dec. 9, 2003   (JP) .............................. 2003-410735
Nov. 29, 2004  (JP) .............................. 2004-344493

(51) Int. Cl.
*G02F 1/1335*    (2006.01)
(52) U.S. Cl. ......................................... 349/95; 349/97
(58) Field of Classification Search ................... 349/95
See application file for complete search history.

(56) References Cited

U.S. PATENT DOCUMENTS 6,535,338 B2    3/2003   Nishikawa et al.

(Continued)

FOREIGN PATENT DOCUMENTS

JP           6-258642 A        9/1994

(Continued)

OTHER PUBLICATIONS

K. Kalantar, IDW'02 pp. 549-552.

*Primary Examiner*—K. Cyrus Kianni
(74) *Attorney, Agent, or Firm*—Birch, Stewart, Kolasch & Birch, LLP

(57) ABSTRACT

A production method for a display panel according to the present invention is production method for a display panel 100 including a display panel 101 and a plurality of microlenses 107 provided on a light-incident side of the display panel 101, including: (a) a step of providing a display panel having a plurality of pixels in a matrix arrangement, wherein each of the plurality of pixels has a plurality of picture elements, including a first picture element 104B transmitting first color light and a second picture element 104R (104G) transmitting second color light which is different from the first color light; (b) a step of forming a photocurable material layer 105 on one of a pair of principal faces, being opposite to each other, of the display panel; (c) a step of exposing the photocurable material layer to light via the display panel, wherein the photocurable material layer is at least partially cured with light which has been transmitted through at least the first picture element; and (d) a step of removing an uncured portion of the photocurable material layer 105' having been exposed to light, thereby forming a plurality of microlenses 107.

19 Claims, 11 Drawing Sheets

U.S. PATENT DOCUMENTS

| | | |
|---|---|---|
| 6,628,355 B1 * | 9/2003 | Takahara .................... 349/106 |
| 2002/0042025 A1 | 4/2002 | Tokai et al. |
| 2002/0080323 A1 | 6/2002 | Muroya |
| 2002/0131022 A1 * | 9/2002 | Shibatani et al. .............. 353/31 |
| 2004/0099633 A1 | 5/2004 | Okada et al. |
| 2004/0114111 A1 * | 6/2004 | Watanabe .................... 353/31 |
| 2004/0240777 A1 * | 12/2004 | Woodgate et al. ............. 385/16 |
| 2005/0253975 A1 * | 11/2005 | Watanabe .................... 349/10 |

FOREIGN PATENT DOCUMENTS

| | | |
|---|---|---|
| JP | 8-511129 A | 11/1996 |
| JP | 9-43427 A | 2/1997 |
| JP | 9-166701 A | 6/1997 |
| JP | 11-251220 A | 9/1999 |
| JP | 11-295504 A | 10/1999 |
| JP | 2000-292862 A | 10/2000 |
| JP | 2002-117756 A | 4/2002 |
| JP | 2003-35824 A | 2/2003 |
| JP | 2004-170628 A | 6/2004 |
| WO | WO-95/12782 A1 | 5/1995 |

* cited by examiner ns or text. Such display devices include: direct-viewing-type display devices, which allow images or the like displayed on a display panel to be viewed directly; and projection-type display devices (projectors), which allow images or the like displayed on a display panel to be projected in an enlarged form on a screen by means of a projection lens. As non-self-emitting type display panels other than liquid crystal display panels, electrochromic display panels, electrophoresis-type display panels, toner display panels, PLZT panel, and the like are known. Currently, liquid crystal display devices are widely used in monitor devices, projectors, mobile information terminals, mobile phones, and the like.

METHOD OF PRODUCING MICRO-LENS-CARRYING DISPLAY PANEL AND DISPLAY UNIT AND EXPOSURE SYSTEM

TECHNICAL FIELD

The present invention relates to a production method for a display panel having a microlens array, a display device, and an exposure apparatus.

BACKGROUND ART

Generally speaking, a display device of a non-self-emitting type, e.g., a liquid crystal display device, causes changes in the transmittance (or reflectance) of a display panel with a driving signal so as to modulate the intensity of light from a light source which is radiated on the display panel, thus displaying images or text. Such display devices include: direct-viewing-type display devices, which allow images or the like displayed on a display panel to be viewed directly; and projection-type display devices (projectors), which allow images or the like displayed on a display panel to be projected in an enlarged form on a screen by means of a projection lens. As non-self-emitting type display panels other than liquid crystal display panels, electrochromic display panels, electrophoresis-type display panels, toner display panels, PLZT panel, and the like are known. Currently, liquid crystal display devices are widely used in monitor devices, projectors, mobile information terminals, mobile phones, and the like.

In a liquid crystal display device, by applying a driving voltage corresponding to an image signal to each of the pixels which are regularly arranged in a matrix, the optical characteristics of the liquid crystal layer in each pixel are changed, whereby image, text, and the like are displayed. As a system for applying independent driving voltages to the aforementioned pixels, there are a passive matrix system and an active matrix system. A liquid crystal display panel of an active matrix system needs to be equipped with switching elements and lines for supplying driving voltages to pixel electrodes. As switching elements, non-linear two-terminal devices such as MIM (metal-insulator-metal) devices and three-terminal devices such as TFT (thin film transistor) devices are used.

When intense light impinges on the switching elements (especially TFTs) which are provided on the display panel, the devices' resistances in their OFF state are decreased. This results in a problem in that the charge which each picture element capacitor acquired during voltage application is discharged, thus making it impossible to obtain a predetermined displaying state, so that light will leak even in a black state and the contrast ratio will decrease.

Therefore, in a liquid crystal display panel, with the purpose of preventing light from impinging on TFTs (especially channel regions), a light shielding layer (called a black matrix) is provided on a TFT substrate having TFTs and pixel electrodes formed thereon, as well as on a counter substrate which opposes the TFT substrate via a liquid crystal layer, for example. In a reflection type liquid crystal display device, the effective pixel area will not decrease if reflecting electrodes are utilized as a light shielding layer. However, in a liquid crystal display device which performs display by utilizing transmitted light, the effective pixel area will be reduced by the provision of a light shielding layer in addition to the non-light-transmitting TFTs, gate bus lines, and source bus lines. As a result, the ratio of the effective pixel area to the total area of the displaying region, i.e., the aperture ratio, will be decreased.

Furthermore, this tendency becomes more prominent as the liquid crystal display panel increases in resolution and becomes smaller in size. This is because, even if the pixel pitch is decreased, the TFTs, bus lines, and the like cannot be made smaller beyond certain sizes, due to constraints in terms of electrical performance, production technique, and the like.

In particular, in a transflective type liquid crystal display device, which have gained prevalence as display devices for mobile devices such as mobile phones in the recent years, each pixel has a region (a reflecting region) which performs display in a reflection mode and a region (transmitting region) which performs display in a transmission mode. Therefore, by reducing the pixel pitch, the ratio of the area of the transmitting regions to the total area of the displaying region (i.e., the aperture ratio of the transmitting regions) will be greatly decreased.

Under dim lighting, a transflective liquid crystal display device performs display by utilizing light from a backlight which is transmitted through the liquid crystal display panel, and under bright lighting, performs display by reflecting light from the surroundings. Thus, a transflective liquid crystal display device is able to achieve display with a high contrast ratio regardless of the surrounding brightness, but has a problem in that its brightness decreases as the aperture ratio of the transmitting regions is decreased.

In particular, the efficiency of light utility (i.e., brightness) will decrease even more in a direct-viewing-type liquid crystal display device or a single-panel projector which performs color displaying by utilizing absorption of light by color filters.

As one method of improving the efficiency of light utility in projection-type liquid crystal display devices, a method has come into practical use in which microlenses for converging light on the respective pixels are provided on the liquid crystal display panel to improve the effective aperture ratio of the liquid crystal display panel. Most conventional microlenses are formed within the counter substrate of the liquid crystal display panel, and are structured so that the microlens are sandwiched between two glass plates.

With reference to FIG. 20(a) and (b), two typical methods for producing a counter substrate which is equipped with conventional microlenses will be described. Note that a plurality of microlenses which are in a regular arrangement will be collectively referred to as a microlens array.

The first production method produces a substrate (microlens array substrate) equipped with a microlens array, through steps (a-1) to (a-4) which are schematically shown in FIG. 20(a).

(a-1): A photoresist layer on a glass substrate is patterned.

(a-2): The patterned resist layer is heated to cause thermal flow, thus forming a resist layer having the shapes of microlenses.

(a-3): together with the resist layer having microlens shapes, the glass substrate is dry-etched in order to form the shapes of the resist layer on the glass substrate (etch back), whereby a microlens array substrate is obtained.

(a-4): Via an adhesion layer, cover glass is adhered to the resultant microlens array substrate, and the surface of the cover glass is polished, whereby a counter substrate is obtained. Note that, an electrode, an alignment film, and the like are formed as necessary.

The second production method produces a counter substrate equipped with a microlens array, through steps (b-1) to (b-4) which are schematically shown in FIG. 20(b).

(b-1): A photoresist layer on a glass substrate is patterned via electron beam exposure, for example, thus forming a resist layer having the shapes of microlenses. This is used as a master.

(b-2): Using the master, a metal stamper is produced, for example by plating technique.

(b-3): Using the metal stamper, the shapes of microlenses are transferred to the glass substrate, thus obtaining a microlens array substrate.

(b-4): Via an adhesion layer, cover glass is adhered to the resultant microlens array substrate, and the surface of the cover glass is polished, whereby a counter substrate is obtained.

Moreover, Patent Document 1 discloses a method in which, by utilizing the pixels of a liquid crystal display panel, a photosensitive material which is applied to the surface of a counter substrate is exposed to light, thus forming microlenses for the pixels through self assembly. This method has advantages in that misalignment between the microlenses and the pixels does not occur, and that the microlenses can be produced at low cost.

[Patent Document 1] Japanese Laid-Open Patent Publication No. 2002-62818

DISCLOSURE OF INVENTION

Problems to be Solved by the Invention

However, the method described in Patent Document 1 uses ultraviolet for exposing the photosensitive material to. Therefore, while the method is applicable to a display panel not including any color filters (e.g., a liquid crystal display panel for a three-panel projector), it is not applicable to a display panel having color filters. The reason is that it is impossible to irradiate the photosensitive material with ultraviolet through the color filters because the color filters absorb ultraviolet. In fact, Patent Document 1 does not even mention any method for forming microlens on a display panel having color filters.

It might be possible, through the aforementioned method, to form microlenses on the counter substrate (or the TFT substrate) prior to producing the liquid crystal display panel, i.e., prior to forming the color filters on the counter substrate. However, this will detract from some of the advantages of the aforementioned method because of the influence of misalignment in the process of attaching both substrates together. Moreover, in order to allow the effects of the microlenses to be fully exhibited, it is preferable to reduce the thickness of the glass substrate having microlenses formed thereon to less than 0.5 mm. However, since a liquid crystal display panel which is produced through multi-substrate processing is to be produced by employing a mother glass substrate of tens of $cm^2$ or more, making this mother glass substrate thin would result in handling problems. Furthermore, when microlenses are formed on a TFT substrate, the substrate will be subjected to a temperature as high as several hundred degrees, which the photosensitive material itself will not survive. Therefore, it is preferable that the microlenses are formed after the liquid crystal display panel has been produced (i.e., after both substrates are attached together), and after the glass substrate has been etched or polished to a desired thickness.

Although the problems of the conventional method of producing a display panel having a microlens array have been described by taking a liquid crystal display device for example, the above-described problems are not limited to liquid crystal display devices, but are also common to other display devices of the non-self-emitting type. Although a construction comprising color filters has been illustrated, this is not a limitation; for example, display devices which perform color displaying by using a dye or the like that is mixed in the display medium layer (liquid crystal layer), e.g., guest-host liquid crystal display devices, have similar problems.

The present invention has been made in view of the above aspects, and a main objective thereof is to provide a method for producing microlenses on a color display panel through self assembly.

Means for Solving the Problems

A production method for a display panel having a microlens array according to the present invention is a production method for a display panel having a microlens array, including a display panel and a plurality of microlenses provided on a light-incident side of the display panel, comprising: (a) a step of providing a display panel having a plurality of pixels in a matrix arrangement, wherein each of the plurality of pixels has a plurality of picture elements, including a first picture element transmitting first color light and a second picture element transmitting second color light which is different from the first color light; (b) a step of forming a photocurable material layer on one of a pair of principal faces, being opposite to each other, of the display panel; (c) a step of exposing the photocurable material layer to light via the display panel, wherein the photocurable material layer is at least partially cured with light which has been transmitted through at least the first picture element; and (d) a step of removing an uncured portion of the photocurable material layer having been exposed to light, thereby forming a plurality of microlenses.

In the descriptions of the present invention, it is assumed that a "pixel" is composed of a plurality of "picture elements", each of which allows light of a specific color to be transmitted therethrough. Typically, each pixel is composed of a red picture element (R-picture element) which transmits red light, a green picture element (G-picture element) which transmits green light, and a blue picture element (B-picture element) which transmits blue light. However, the picture elements to be included in each pixel are not limited to this example. A W picture element which transmits light of another color (e.g., white light) may be further included in addition to the R-picture element, G-picture element and B-picture element. Picture elements which transmit the light of C(cyan), M(magenta), and Y(yellow) colors may be included. One pixel may include more than one picture elements that transmit light of the same color. Note that, in the present specification, a light-transmitting region in a picture element will be referred to as an "aperture of the picture element".

In one embodiment, step (a) is a step of providing a display panel such that, among central wavelengths of any color light transmitted through the plurality of picture elements, a central wavelength of the first color light is the shortest wavelength.

In one embodiment, step (b) is a step of forming a photocurable material layer which is photosensitive to light of shorter wavelengths than the central wavelength of the first color light.

Herein, a central wavelength of color light which is transmitted through a picture element refers to a wavelength which is in the center of a wavelength range that defines the color of visible light (no less than 380 nm and no more than 800 nm) which has been transmitted through each picture element. For example, the central wavelength is in the range of 600 nm to 650 nm for red light; in the range of 520 nm to 580 nm for green light; and in the range of 430 nm to 490 nm for blue light. However, any light of a wavelength that has a relative transmittance value of 10% or less will be ignored even if it falls within the wavelength range of visible light that is transmitted through the picture element.

In one embodiment, step (c) comprises a step of at least partially curing, with light transmitted through the first picture element, the photocurable material layer corresponding to the plurality of picture elements included in each of the plurality of pixels; and step (d) comprises a step of forming a plurality of microlenses arranged in accordance with the arrangement of the plurality of pixels of the display panel. The array of a plurality of microlenses may be a plurality of lenticular lenses that are arranged so that each corresponds to plural rows of pixels in a matrix arrangement, or may be a plurality of microlenses respectively corresponding to individual ones of a plurality of pixels, for example. Furthermore, they may be a plurality of microlenses that are arranged so as to correspond to the respective picture elements included in a plurality of pixels in a matrix arrangement. In a transflective display device in which each picture element has a transmitting region and a reflecting region, the microlenses may correspond to the respective transmitting regions (apertures of the picture elements). Moreover, the plurality of microlenses may each be formed as an independent lens, e.g., rectangular lenses (including square lenses), or the plurality of microlenses may be integrally formed, e.g., lenticular lenses.

In one embodiment, step (a) is a step of providing a display panel such that each of the plurality of pixels has the first picture element in a substantial center thereof.

In one embodiment, step (a) is a step of providing a display panel such that the plurality of picture elements include a red picture element, a blue picture element, and a green picture element; and step (c) is a step of at least partially curing the photocurable material layer with light transmitted through at least the blue picture element.

In one embodiment, step (b) is a step of forming a photocurable material layer which is photosensitive to light in a wavelength range of no less than 380 nm and no more than 420 nm.

In one embodiment, step (c) comprises a step of at least partially curing, with light transmitted through at least the blue picture element, regions of the photocurable material layer corresponding to the red picture element, the blue picture element, and the green picture element.

In one embodiment, step (c) comprises a step of performing exposure to substantially parallel light while varying an incident angle of the substantially parallel light with respect to the one principal face.

In one embodiment, step (c) comprises a step of performing a scan with the substantially parallel light in such a manner that a plurality of lenticular lenses arranged corresponding to rows of the plurality of pixels in the matrix arrangement are formed.

In one embodiment, step (c) comprises a step of performing a scan with the substantially parallel light in such a manner that a plurality of microlenses arranged corresponding respectively to the plurality of picture elements included in the plurality of pixels in the matrix arrangement are formed.

In one embodiment, step (c) comprises a step of adjusting a light distribution.

In one embodiment, step (c) comprises a step of adjusting the light distribution by using a photomask having a predetermined distribution of transmittance.

In one embodiment, the microlenses each have a flat portion in an apex portion thereof, the flat portion having no light converging effects.

In one embodiment, the microlens are lenticular lenses, each flat portion having a size substantially equal to or smaller than a size of an aperture of each picture element of the display panel along a converging direction of the lenticular lenses.

In one embodiment, the microlenses correspond to respective apertures of the plurality of picture elements of the display panel, each flat portion having a size substantially equal to or smaller than a size of an aperture of each picture element.

A production method for a display device according to the present invention comprises: a step of providing a display panel having a microlens array as produced by any of the production methods above; and a step of disposing a surface illuminant at the microlens side of the display panel.

A display device according to the present invention is a display device comprising: a display panel having a microlens array as produced by any of the production methods above; and a surface illuminant for emitting light toward the microlens array of the display panel.

A exposure apparatus according to the present invention is an exposure apparatus for exposing a photosensitive resin layer to light, comprising: an optical system for emitting substantially parallel light; a stage having a receiving surface for receiving an object for exposure having the photosensitive resin layer formed thereon; and an incident angle controlling mechanism for changing, in a gradual or stepwise manner, an incident angle of the substantially parallel light emitted from the optical system with respect to the receiving surface of the stage. The exposure apparatus according to the present invention can be suitably used for a production method for the aforementioned display panel having a microlens array.

In one embodiment, the incident angle controlling mechanism is capable of changing the incident angle with respect to the receiving surface at a predetermined speed. The predetermined speed is to be set by a user.

In one embodiment, the incident angle controlling mechanism is capable of varying the speed. The speed is varied in a gradual or stepwise manner.

In one embodiment, the incident angle controlling mechanism is capable of varying the speed in a stepwise manner, in connection with the incident angle.

In one embodiment, the incident angle controlling mechanism is capable of changing the incident angle in connection with an irradiation time.

In one embodiment, the incident angle controlling mechanism includes a mechanism for rotating the receiving surface around an axis extending in a predetermined direction on the object for exposure placed on the receiving surface.

In one embodiment, the optical system includes a light source section and a mirror section for reflecting light from the light source section; and the incident angle controlling mechanism includes a mechanism for changing a reflection angle of the light at the mirror section.

In one embodiment, the incident angle controlling mechanism includes a mechanism for changing a position of the optical system relative to the receiving surface of the stage.

A method for forming a microlens array according to the present invention is characterized by exposing a photocurable resin to light by using any of the exposure apparatuses above.

Effects of the Invention

With a production method for a display panel having a microlens array according to the present invention, microlenses are formed by using a photocurable material (typically a photocurable resin) which cures by being exposed to light of a specific color (e.g., first color light: blue light). Therefore, by utilizing light which has been transmitted through picture elements of the specific color, microlenses can be formed for the pixels (or picture elements) of the color display panel, through self assembly.

According to the production method of the present invention, for example, microlenses corresponding to pixels each composed of R, G, and B-picture elements can be formed by using light transmitted through the B-picture elements; or microlenses respectively corresponding to the R-picture elements, G-picture elements, and B-picture elements can also be formed.

Therefore, microlenses can be formed at a very low cost; and, through self assembly, the microlenses are disposed relative to the pixels or picture elements. As a result, the converging function of the microlenses is fully exhibited, whereby a display device capable of displaying with a high brightness can be produced. Moreover, after the light converged through the microlenses has traveled through the picture elements, the light diverges while maintaining the same angle of convergence. Therefore, viewing-angle widening effects are obtained. In other words, the direct-viewing-type display device according to the present invention features high brightness as well as wide viewing angle.

Moreover, as the light which causes the photocurable material to photoreact (cure), light which has been transmitted through the picture element that transmits color light having the shortest central wavelength among the plurality of picture elements composing the pixel may be used. As a result, absorption by the photocurable material (photo-initiator), if any, exerts only a little influence, and the deterioration in color reproducibility at the display is suppressed. Typically, it is preferable to use light which has been transmitted through blue picture elements, and it is more preferable to use light having a shorter wavelength than the central wavelength of blue light (e.g. 450 nm). It is particularly preferable to use light having a wavelength in the range from 380 nm to 420 nm.

Figure 1:
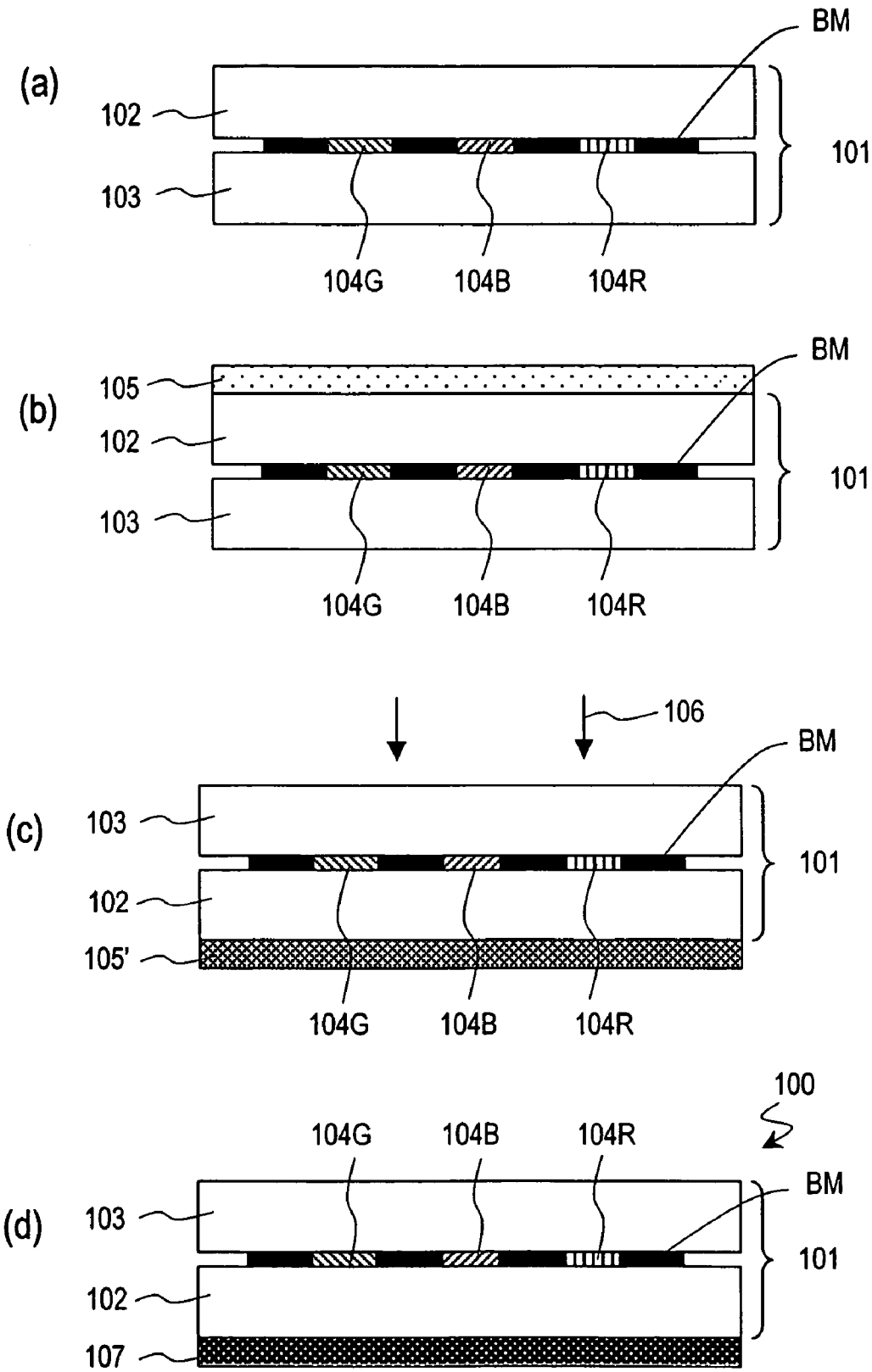
[FIG. 1](a) to (d) are schematic cross-sectional views for describing a production method for a liquid crystal display panel 100 having a microlens array according to an embodiment of the present invention.

DESCRIPTION OF THE REFERENCE NUMERALS 100 liquid crystal display panel having a array
101 liquid crystal display panel
102 TFT substrate
103 counter substrate
104R red picture element (red color filter)
104G green picture element (green color filter)
104B blue picture element (blue color filter)
105 photocurable resin layer
105', 105" cured portion of photocurable resin layer microlens

BEST MODE FOR CARRYING OUT THE INVENTION

Hereinafter, with reference to the figures, a production method for a display panel having a microlens array according to an embodiment of the present invention, as well as a liquid crystal display device incorporating the same, will be described. However, the present invention is not limited thereto.

With reference to FIG. 1, a production method for a display panel 100 having a microlens array according to an embodiment of the present invention will be described. FIG. 1(a) to (d) are schematic cross-sectional views for describing a production method for microlens array according to an embodiment of the present invention.

Firstly, as shown in FIG. 1(a), a color liquid crystal display panel 101 is prepared. Herein, a liquid crystal display panel 101 on which R, G, and B color filters 104R, 104G and 104B corresponding to picture elements are formed is prepared. Note that, for simplicity, the picture elements corresponding to the color filters 104R, 104B and 104G may herein be referred to as R-picture elements 104R, B-picture elements 104B, and G-picture elements 104G. Also for simplicity, regions corresponding to the apertures (transmitting regions) of the respective picture elements are illustrated as picture elements 104R, 104G and 104B herein. Although an example is illustrated where the apertures of the picture elements are located substantially in the centers of the picture elements, this is not a limitation.

The liquid crystal display panel 101 includes: a TFT substrate 102; and a counter substrate 103 on which the color filters 104R, 104G and 104B are formed. A predetermined liquid crystal layer (not shown) is formed between the TFT substrate 102 and the counter substrate 103. On the side of the TFT substrate 102 facing the liquid crystal layer, circuit elements are formed (none of them is shown), such as: pixel electrodes which are provided so as to correspond to the picture elements in a matrix arrangement; TFTs connected to the pixel electrodes; and gate bus lines source bus lines. On the side of the counter substrate 103 facing the liquid crystal layer, the color filters 104R, 104G and 104B, a light shielding layer BM interposed therebetween, and a counter electrode (not shown) are formed. On the faces of the TFT substrate 102 and the counter substrate 103 that are in contact with the liquid crystal layer, alignment films (not shown) are formed as necessary.

As shown in FIG. 1(b), a photocurable resin is applied to the TFT substrate 102 of the liquid crystal display panel 101, thus forming a photocurable resin layer 105. Herein, a photocurable resin having a sensitive wavelength in a wavelength range from 380 nm to 420 nm is used.

Note that, in order to enhance adhesion between the photocurable resin layer 105 and the TFT substrate 102, it is preferable to modify the surface by, for example, applying a silane coupling agent on the glass surface of the TFT substrate 102 prior to the application of the photocurable resin.

Now, with reference to FIG. 2A, the spectral transmittance characteristics of the color filters 104R, 104G and 104B will be described.

Since almost no light near 400 nm is transmitted through the picture elements in which the color filters 104R and 104G are formed, even if exposure irradiation light 106 near 400 nm is allowed to enter from the counter substrate 103 side of the liquid crystal display panel 101, the photocurable resin will hardly photoreact (cure) with the light which has been transmitted through these picture elements.

By employing a photosensitive material layer which has a sensitive wavelength on the shorter wavelength side of the passing wavelength band of the blue color filters 104B (in particular from 380 nm to 420 nm), it is possible to form microlenses having a very high transmittance in the visible region, as soon as the photosensitive material is allowed to photoreact with the transmitted light through the color filters 104B. Specifically, a photosensitive material usually absorbs light of its own sensitive wavelength. Therefore, if a photocurable material having a sensitive wavelength in red (R) or green (G) is used, for example, part of the R or B light is absorbed, so that the color reproducibility when displaying is degraded. Although a similar phenomenon also occurs for blue (B), there is little influence on the color reproducibility. In particular, as shown in FIG. 2B, when using a light source whose emission spectrum is on the longer wavelength side of the neighborhood of 420 nm, e.g., an LED light source as a backlighting light source used in the liquid crystal display device of a mobile phone, a PDA, a digital still camera, or the like, it becomes possible to more effectively suppress degradation in the color reproducibility by using light of a wavelength in the range from 380 nm to 420 nm.

Note that, generally speaking, there exist almost no color filters (dyes or pigments) that transmit light (ultraviolet) of wavelengths less than 380 nm. In order to use ultraviolet, it would be necessary to perform the light irradiation prior to forming the color filters, as described earlier.

Figure 2A:
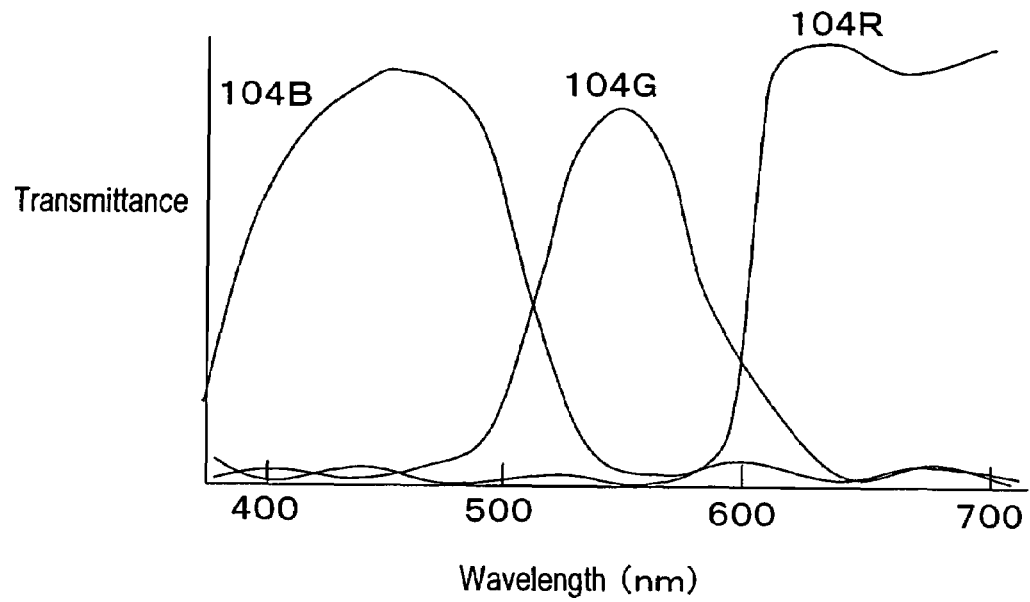
[FIG. 2A] A graph showing the spectral transmittance characteristics of color filters included in a liquid crystal display panel 101 according to an embodiment of the present invention.
Figure 2B:
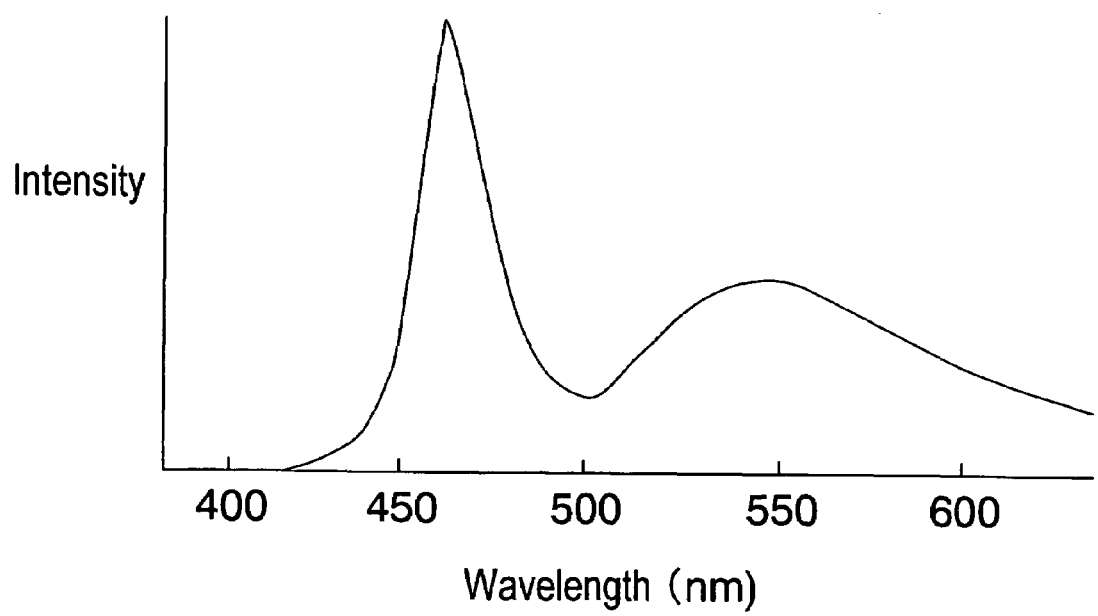
[FIG. 2B] A graph showing an example of an emission spectrum of an LED light source.

Since the light which has been transmitted through the picture elements in which the color filters 104B are formed includes light near 400 nm as shown in FIG. 2A, when light which has been transmitted through these picture elements (blue picture elements) enter the photocurable resin layer 105, the photocurable resin photoreacts in accordance with the light amount, and thus cures. If the irradiation time is constant, curing occurs in accordance with the light distribution. In other words, a distribution of degees of cure is created. Therefore, by adjusting the distribution of light amounts (light distribution and/or irradiation time), it becomes possible to create a distribution of degrees of cure in the photocurable resin layer. Note that "light distribution" means an intensity distribution of light entering the display panel (to which the photosensitive material layer is exposed), against its angle (incident angle) with respect to the surface normal of the display panel, where the incident angle to each blue picture element and the incident position on the photosensitive material layer have a 1:1 correspondence.

After removing the uncured portions by subjecting the photocurable resin layer (which has been exposed to light) to development, microlenses of shapes corresponding to the distribution of degrees of cure are obtained. The light distribution can be adjusted by varying the incident angle of the exposure irradiation light, for example. Alternatively, a distribution of irradiation time may be adjusted through relative movements of the exposure irradiation light and the photocurable resin layer 105, e.g., through a scan with exposure irradiation light. These may be combined. Furthermore, the light distribution may be adjusted by using a photomask having a predetermined distribution of transmittance. Moreover, by allowing exposure irradiation light to obliquely enter the photocurable resin layer 105 via each blue picture element 104B, it is possible to form a microlens, e.g., a lenticular lens, corresponding to the R-picture element 104R and the G-picture element 104G that are contained in the same pixel as the B-picture element 104B (i.e., a microlens corresponding to the pixel), or form microlenses respectively corresponding to the B-picture element 104B, the R-picture element 104R, and the G-picture element 104G (i.e., microlenses corresponding to the apertures of the picture elements). It would be preferable to dispose the aperture of the picture element which transmits the exposure irradiation light so as to be in a substantial center of each pixel, because it will facilitate adjustment of the distribution of light amounts. For example, in the case of a pixel in which a red picture element, a blue picture element, and a green picture element are symmetrically arranged in this order, by performing a scan with the exposure irradiation light in a symmetric manner around the blue picture element, a microlens having a symmetric shape with respect to the center line of the pixel can be easily formed.

With reference to FIG. 3(a) to (c), an example of forming a lenticular lens corresponding to a pixel will be described. FIG. 3(a) is a plan view and a cross-sectional view schematically showing a portion corresponding to one pixel of the display panel 100 having a microlens array, where the counter substrate 103 is omitted. FIG. 3(b) and (c) are diagrams for describing the details of an exposure process (FIG. 1(c)) for producing the display panel having a microlens array shown in FIG. 3(a). FIG. 3(b) is a schematic cross-sectional view taken along line A-A' in FIG. 3(a), and FIG. 3(c) is a schematic cross-sectional view taken along line B-B' in FIG. 3(a).

As shown in FIG. 3(a), one pixel of the display panel 100 is composed of an R-picture element 104R, a B-picture element 104B, and a G-picture element 104G. A black matrix BM (light-shielding region) is provided around each picture element. The pixels are placed in a matrix arrangement, constituting rows (X direction) and columns (Y direction). Herein, an example where a pixel pitch $P_X$ along the X direction and a pixel pitch $P_Y$ along the Y direction are both 150 μm is illustrated. In the case of a TFT-type display device, typically, the row direction (X direction) is parallel to the gate bus lines and the column direction (Y direction) is parallel to the source bus lines (video lines).

The microlens array of the display panel 100 includes a plurality of lenticular lenses 107 which are arranged so as to correspond to plural rows of pixels. Each lenticular lens 107 extends along the row direction (X direction), and has converging power along the column direction (Y direction), but does not have any converging power along the row direction (X direction).

With reference to FIG. 3(b) and (c), an exposure process for forming the lenticular lens 107 will be described.

As shown in FIG. 3(b), in a plane containing line A-A', the direction in which the irradiation light 106 strikes the liquid crystal display panel 101 is varied from a direction which is defined by an incident angle θ1 to a direction which is defined by an incident angle θ2; and in a plane containing line B-B' as shown in FIG. 3(c), it is varied from a direction which is defined by an incident angle θ3 to a direction which is defined by an incident angle θ4. In other words, the incident angle of the illumination light 106 is varied in a gradual or stepwise manner from θ1 to θ2 within the plane containing line A-A', and varied in a gradual or stepwise manner from θ3 to θ4 within the plane containing line B-B'. As the exposure irradiation light 106, parallel light is preferably used. The degree of parallelism of exposure irradiation light is preferably within ±3°, and more preferably within ±1° in order to accurately control the shapes of the microlenses.

At this time, it is preferable that the incident angles θ1 and θ2, and θ3 and θ4 of the irradiation light 106 are prescribed so that microlenses will be formed without interspaces therebetween. For example, as shown in FIG. 3(b), the incident angles θ1 and θ2 are to be prescribed appropriately so that the rays of light which have been transmitted through the B-picture elements of adjoining pixels will coincide at a middle point (point a in FIG. 3(b)) between the adjoining pixels, and that the film thickness will be the same between the lenticular lenses corresponding to the adjoining pixels, in accordance with the pixel pitch $P_X$ of the liquid crystal display panel 101 and the thickness of the counter substrate 103. Moreover, as shown in FIG. 3(c), the incident angles θ3 and θ4 are to be prescribed appropriately so that the rays of light which have been transmitted through the B-picture elements of adjoining pixels will coincide at a middle point (point b in FIG. 3(c)) between the adjoining pixels, and that a boundary between the lenses will be formed (i.e., so that the lens film thickness will become thinnest at the middle point between the adjoining pixels), in accordance with the pixel pitch $P_Y$ of the liquid crystal display panel 101 and the thickness of the counter substrate 103.

In the illustrated liquid crystal display panel 101, the pixel pitch $P_X$ along the row direction (i.e., the direction in which the color filters are arranged) is 150 μm; the pixel pitch $P_Y$ along the column direction (which is perpendicular to the row direction) is 150 μm; and the physical thickness of the counter substrate 103 is 400 μm (which would be converted to 400/1.52=260 μm of air). Therefore, θ1 and θ2 and θ3 and θ4 will be:

$$\theta 1 = \theta 2 = \theta 3 = \theta 4 = \tan^{-1}(75/260) = \text{about } 16°.$$

Moreover, as the light enters more obliquely (i.e., as the incident angle increases), the irradiated area on the irradiated surface will become broader, and thus the intensity of irradiation will become weaker. Therefore, depending on the distribution of degrees of cure (shapes of microlenses) to be formed on the photocurable resin layer 105, it might be necessary to adjust the incident angles θ1 and θ2 (θ3 and θ4) from the angles that are derived through the above calculation.

Next, the scanning method for the irradiation light 106 will be described. As used herein, "scanning" encompasses performing a two-dimensional scan over a region that is irradiated with the exposure irradiation light 106, as well as varying the incident angle of the irradiation light. Moreover, a scanning occurs when relative positions and the angle of the irradiation light 106 and the photocurable resin layer 105 go through any relative changes. Therefore, the liquid crystal panel 101 on which the photocurable resin layer 105 is formed may be moved, or the irradiation light (light source) may be moved.

In the present embodiment, lenticular lenses 107 which do not have any converging power along the direction in which the color filters 104R, 104G and 104B are arrayed (i.e., the row direction: X direction) are to be formed. Therefore, along the X direction (parallel to line A-A'), the scanning is performed so that there is a uniform distribution of light amount (illuminance×time); and, along the Y direction (parallel to line B-B'), the scanning speed is made faster as the incident angle of the irradiation light increases, and the scanning speed is made slower as the incident angle decreases (i.e., as becoming closer to the normal direction of the display panel). For example, in the case where the scan is performed with incident angles from −30° to +30° with respect to the normal of the display panel, the scan is performed at a speed of 5°/sec in the angle range from −30° to −10°; the scan is performed at a speed of 3°/sec in the angle range from −10° to +10°; and the scan is performed at a speed of 5°/sec in the angle range from +10° to +30°.

Figure 4:
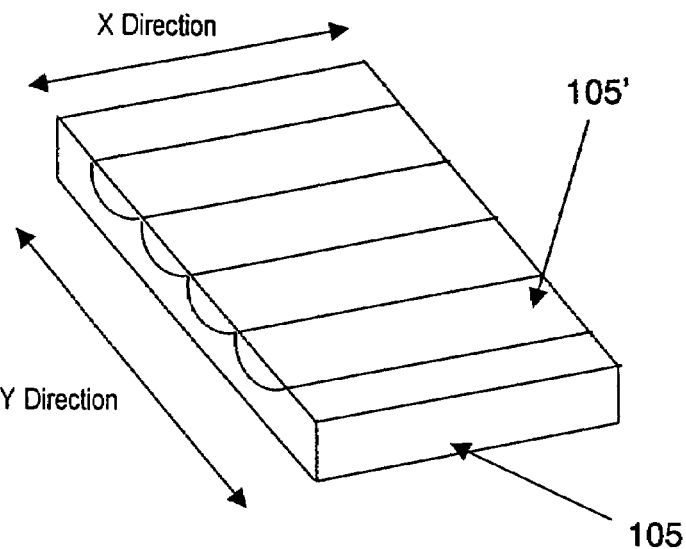
[FIG. 4] A schematic diagram for describing an exposure method in a production method for a liquid crystal display panel having a microlens array according to an embodiment of the present invention.

Thus, by exposing the photocurable resin layer 105 to the irradiation light 106 in scanning fashion, as schematically shown in FIG. 4, it becomes possible to cure portions 105' which correspond to lenticular lenses 107 that have curvature only along the Y direction and have no curvature along the X direction.

Figure 5:
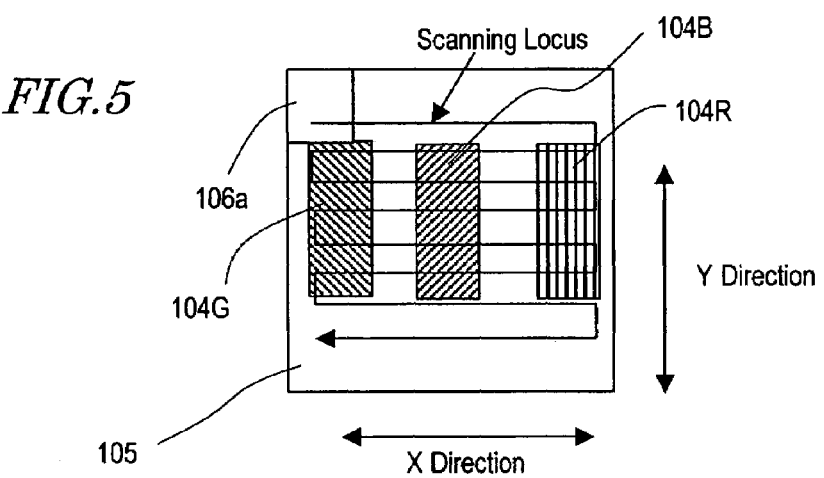
[FIG. 5] A schematic diagram for describing an exposure method in a production method for a liquid crystal display panel having a microlens array according to an embodiment of the present invention.

As for a method of performing a scan with the irradiation light 106 along the X direction and along the Y direction, as schematically shown in FIG. 5, scanning is performed along both the X direction and the Y direction. FIG. 5 shows a locus of how the region 106a that is irradiated with the irradiation light 106 is moved over the photocurable resin layer 105. Moreover, the incident angle of the illumination light may be varied gradually or in a stepwise manner.

After the exposure process, the uncured portions of the photocurable resin layer 105 are removed in a development process, whereby lenticular lenses 107 having the shapes of the cured portions 105' are obtained. Note that, after the development process, it would be preferable to again irradiate the cured portions 105' (lenticular lenses 107) of the photocurable resin layer 105 with exposure irradiation light, so as to allow curing of the photocurable resin to further progress and bring it close to a completely cured state. Moreover, thermosetting may also be employed together with photocuring.

Next, examples of exposure apparatuses to be suitably used for an exposure process in the above-described production method will be described with reference to FIG. 6, FIG. 7, and FIG. 8.

Figure 6:
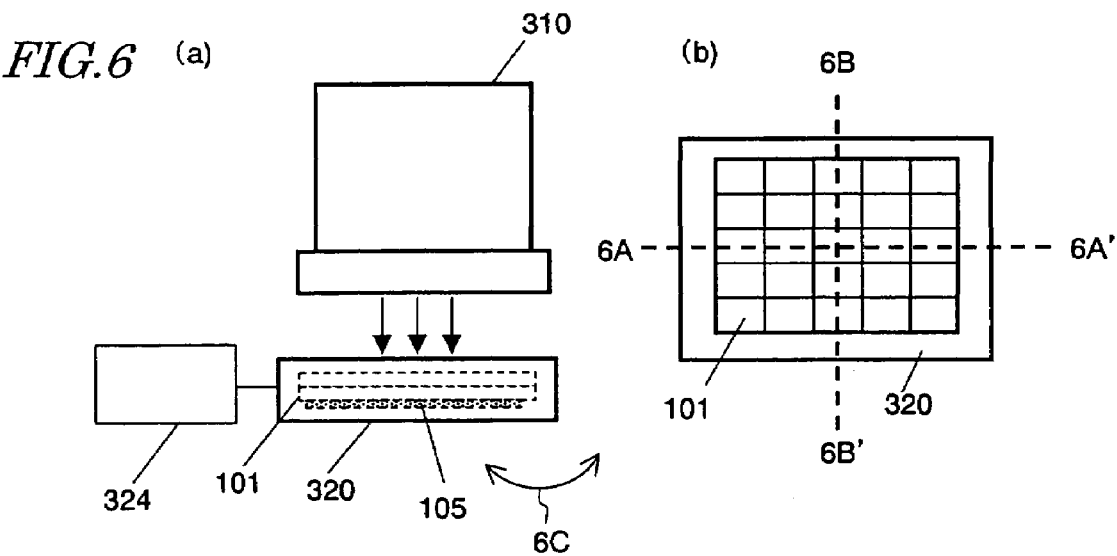
[FIG. 6](a) and (b) are diagrams schematically showing the construction of an exposure apparatus according to an embodiment of the present invention.
Figure 7:
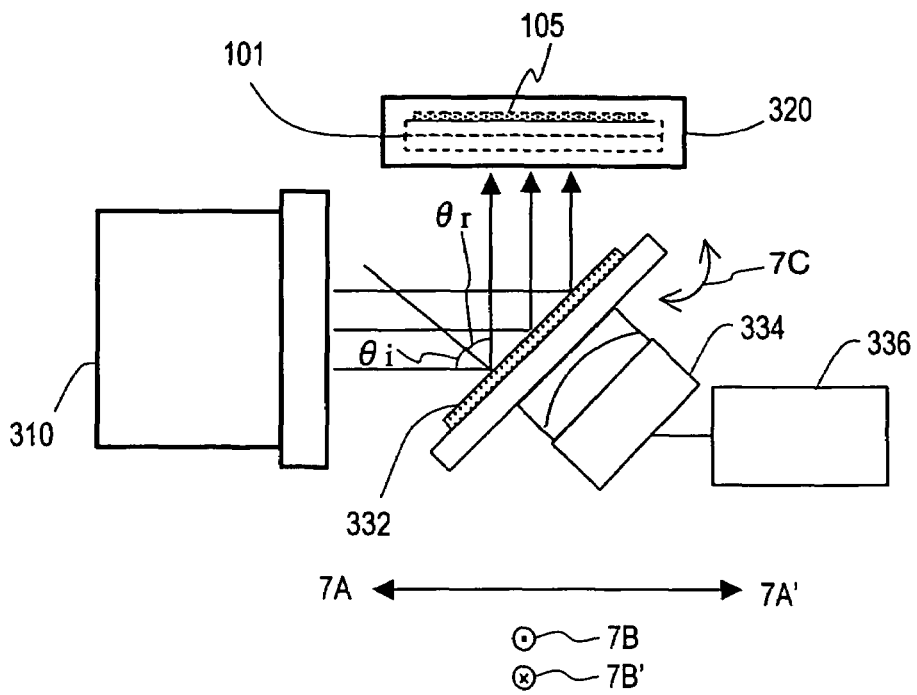
[FIG. 7] A diagram schematically showing the construction of an exposure apparatus according to another embodiment of the present invention.
Figure 8:
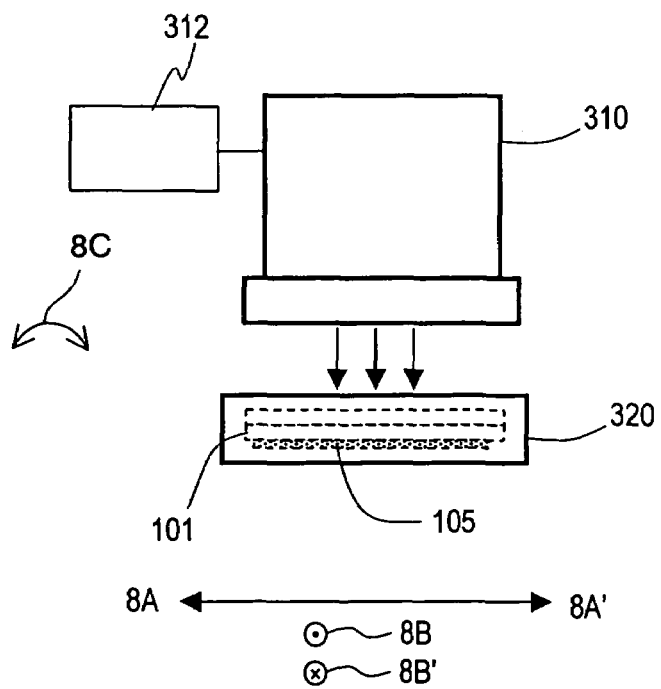
[FIG. 8] A diagram schematically showing the construction of an exposure apparatus according to still another embodiment of the present invention.

The exposure apparatuses according to embodiments of the present invention as shown in FIGS. 6 to 8 each include: an optical system for emitting substantially parallel light to which a photocurable resin layer that is formed on a principal face of the display panel is exposed; a stage having a receiving surface on which the display panel is received; and an incident angle controlling mechanism for allowing an incident angle of substantially parallel light which is emitted from the optical system, with respect to the receiving surface of the stage, to be changed in a gradual or stepwise manner. It is preferable that the incident angle controlling mechanism is able to change the incident angle with respect to the receiving surface at a predetermined speed, where the predetermined speed is set by the user in accordance with the incident angle, light amount, and the like.

Furthermore, it is preferable that the incident angle controlling mechanism is able to vary the speed in a gradual or stepwise manner (so that it is variable). For example, in order to adjust the light amount in a series of processes for forming microlenses, as described above, an ability to vary the speed in a stepwise manner in connection with the incident angle would be preferable. By adjusting the speed with which the incident angle is changed, it becomes possible to obtain microlens shapes which are even closer to the desired shapes.

Furthermore, it would be preferable that the incident angle controlling mechanism is able to change the incident angle in connection with the irradiation time. The irradiation time would be controlled, for example, based on opening/closing of a shutter which is provided between the optical system and the receiving surface, and the incident angle controlling mechanism would change the incident angle with reference to a point in time at which the shutter is opened.

The exposure apparatus shown in FIG. 6(*a*) includes: an optical system (light source section) 310 for emitting substantially parallel light; a stage 320 having a receiving surface on which the display panel 101 is received; and a stage control device 324. A photocurable resin layer 105 is formed on a principal face of the display panel 101. In accordance with a signal from the stage control device 324, the stage 320 rotates its receiving surface around a certain axis which extends along a predetermined direction that fits within the plane of the display panel 101 placed on the receiving surface of the stage 320. However, a complete turn is not required. A movement occurring within a predetermined angle range, so as to present a circular arc as shown by 6C in FIG. 6(*a*), would suffice.

The axis(es) around which the receiving surface is rotated, as shown in FIG. 6(*b*), is/are an axis 6A-6A' extending along the row direction of pixels in a matrix arrangement of the display panel 101 and/or an axis 6B-6B' extending along a direction perpendicular thereto (which typically is the column direction of pixels). The stage 320 should be able to rotate the receiving surface around at least one axis. The display panel 101 is placed on the receiving surface so as to be rotated in predetermined directions. At this time, a placement such that the rotation axis is positioned within the curable resin layer 105 would be preferable.

The exposure apparatus shown in FIG. 7 includes: a light source section 310 for emitting substantially parallel light; and a mirror section for reflecting the light from the light source section 310. The mirror section includes a mirror 332, a mirror driving section 334 which changes an angle $\theta r$ of reflection at the mirror 332 (which is equal to an angle $\theta i$ of incident to the mirror), and a mirror control section 336 for controlling the mirror driving section 334. These elements change the incident angle of light with respect to the display panel 101 being placed on the receiving surface of the stage 320. In other words, by changing the angle of the surface of the mirror 332 (i.e., the reflection surface), the incident angle of light with respect to the display panel 101 is changed. The mirror 332 is operated, for example, so as to present a circular arc 7C as shown in FIG. 7, and/or to present a circular arc within a plane which is perpendicular to the plane of the figure.

In this exposure apparatus, when the angle of the mirror 332 alone is changed, not only the incident angle of light with respect to the display panel 101 will change, but also the irradiated position will change. Therefore, in order to irradiate the entire surface of the display panel 101 over the entire range of movable angles of the mirror 332, the irradiated region would need to be larger than the display panel 101, thus resulting in an increased cost for enlarging the light source section 310. In order to prevent this, a mechanism for moving the mirror 332 along a 7A-7A' direction as shown in FIG. 7 concurrently with changing the angle of the mirror 332 to present the circular arc 7C may be provided, thereby correcting any deviation of the irradiated region that occurs with the changing angles of the mirror 332. In the case where the angle of the mirror 332 is to be changed so as to present a circular arc within a plane that is perpendicular to the plane of the figure, a mechanism for moving the mirror 332 in 7B,7B' directions that are perpendicular to the plane of the figure may be provided.

The exposure apparatus shown in FIG. 8 includes a mechanism for changing the position of the optical system 310 relative to the receiving surface of the stage 320. In accordance with a signal from an optical system control section 312, the optical system 310 operates, for example, so as to present a circular arc as shown in by 8C in FIG. 8, whereby the incident angle of substantially parallel light which is emitted toward the display panel on the receiving surface of the stage 320 is changed.

In this exposure apparatus, when the angle of the light source section 310 alone is changed, not only the incident angle of light with respect to the display panel 101 will change but also the irradiated position will change, as in the case of the exposure apparatus shown in FIG. 7. Therefore, with respect to a 8A-8A' direction in FIG. 8 or a 8B or 8B' direction, it would be preferable to change the angle and the position of the light source section 310 so that it rotates in concentric circles around center axes (see 6A-6A', 6B-6B' in FIG. 6) of the displaying section of the display panel 101.

It would be preferable that the above-described incident angle controlling mechanism is able to change the incident angle in connection with the irradiation time. The irradiation time (exposure time) would be controlled, for example, based on opening/closing of a shutter (not shown) which is provided between the optical system (light source section) 310 and the receiving surface of the stage 320. Thus, the incident angle controlling mechanism may be operated concurrently with the opening/closing actions of the shutter.

For example, after the stage is set in a position for obtaining a predetermined incident angle (e.g., −30°), the angle is changed in the range up to −10° at a speed of 5°/sec, with reference to a point in time at which the shutter is opened. Thereafter, the angle is changed in the range from −10° to +10° at a speed of 3°/sec, and the angle is further changed in the range from +10° to +30° at a speed of 5°/sec. When the incident angle has reached +30°, the shutter is closed. This sequence of operations can be controlled based on time, with reference to the point in time at which the shutter is opened.

Moreover, the incident angle controlling mechanisms of the exposure apparatuses shown in FIG. 6 to FIG. 8 can be combined as appropriate. In the case of performing a bi-axial scanning as described with reference to FIG. 5, the incident angle controlling mechanisms of the exposure apparatuses shown in FIG. 6 to FIG. 8 may be combined so that, for example, one of the two axes is controlled via the stage 320 (FIG. 6) whereas the other axis is controlled via the mirror 332 (FIG. 7). With such a construction, it becomes unnecessary to provide a mechanism for causing movements around two axes at a single site, thus facilitating the designing of the exposure apparatus.

Note that the exposure process may be performed for each display panel 101, or may be performed universally for a large panel that includes a plurality of display panels 101.

Although FIG. 6 to FIG. 8 illustrate examples where the curable resin layer 105 is exposed to light through the display panel 101, this is not a limitation. For example, the exposure may conversely be performed through the curable resin layer 105. In this case, however, a mask which enables exposure of the curable resin layer 105 in a desired pattern would be placed near a surface of the curable resin layer 105 opposite from the display panel 101, and an exposure to the light which has traveled through this mask would be effected.

Without being limited to the purpose of forming microlenses by using a photocurable resin, the above-described exposure apparatuses can be broadly used for the purposes of exposing a photosensitive resin (regardless of negative type or positive type) to light.

In the above embodiment, the photocurable resin layer 105 is scanned with the irradiation light 106 to effect exposure for attaining desired microlens shapes. However, it would also be possible to form microlenses without performing scanning, by previously adjusting the irradiation light 106 so as to have a light distribution for obtaining desired microlens shapes. According to this method, the time required for scanning can be reduced, so that microlenses can be formed in a short period of time, thus improving the producibility.

Figure 9:
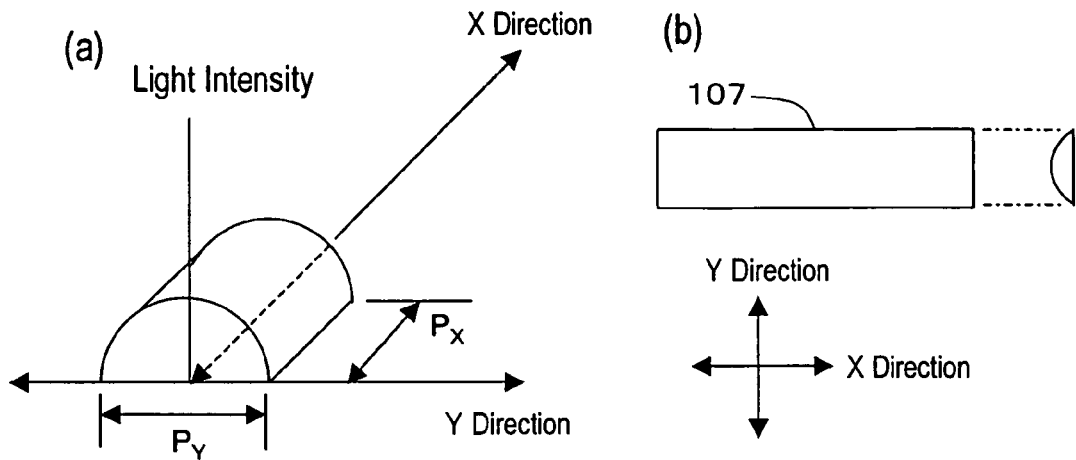
[FIG. 9](a) and (b) are schematic diagrams for describing a light distribution that is used for an exposure process in a production method for a liquid crystal display panel having a microlens array according to an embodiment of the present invention.

For example, in the case where lenticular lenses 107 as shown in FIG. 9(*b*) are to be produced, the irradiation light 106 may be adjusted so as to have the light distribution schematically shown in FIG. 9(*a*). In other words, irradiation light which has a constant intensity in the range from θ1 to θ2 (see FIG. 3(*b*)) along the X direction and has a light distribution such that the intensity becomes weaker as the incident angle increases along the Y direction may be used.

Figure 10:
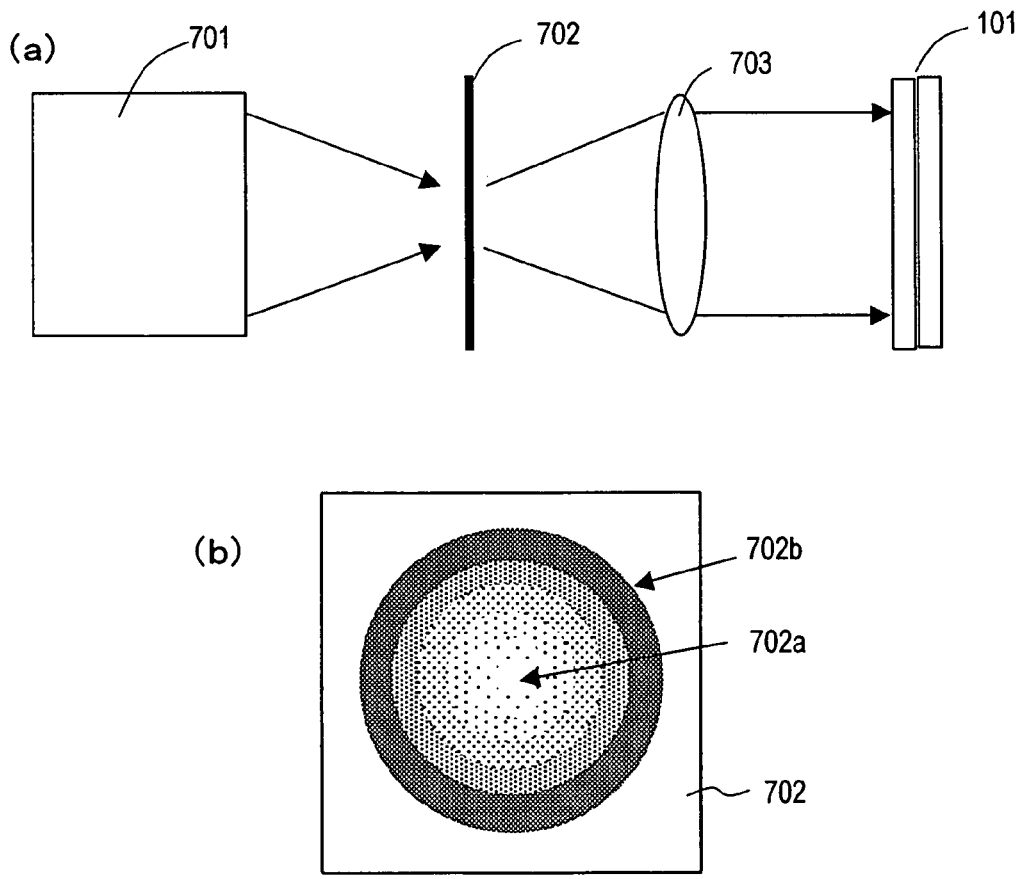
[FIG. 10](a) and (b) are diagrams for describing a method for adjusting the light distribution that is used for an exposure process in a production method for a liquid crystal display panel having a microlens array according to an embodiment of the present invention, where (a) is a schematic diagram showing an optical system, and (b) is a schematic diagram showing the construction of a mask.

For example, as shown in FIG. 10(*a*), the light from the light source 701 may be once converged, and a mask 702 having regions whose transmittances differ in a stepwise (or gradual) manner may be inserted at the converging point, whereby the light distribution can be adjusted.

As the mask 702, although depending on the light distribution of the light from the light source 701, in the case of producing usual circular lenses, for example, as shown in FIG. 10(*b*), a mask whose transmittance changes in a stepwise (or gradual) manner from a central region 702*a* toward a peripheral region 702*b* is used, so that the light which has been transmitted through the mask 702 will have a light distribution such that it becomes more intense toward the central portion. In the case of producing the lenticular lenses 107 as mentioned above, a light distribution such that the light has a stronger intensity distribution toward the central portion, but only along one direction (Y direction), may be used.

Moreover, exposure via scanning and exposure via light distribution control may both be used together. In this case, it would be possible to perform scanning along one of the X direction or the Y direction and adjust the light distribution along the other, for example.

As described above, when lenticular lenses 107 having converging effects only along the column direction (Y direction) are used for a display panel having pixels in a stripe arrangement, the intensity distribution along the row direction (X direction) may be constant, as shown in FIG. 9. Therefore, if a light source which emits light of a uniform light distribution is used, it is hardly necessary to adjust the light distribution, whereby the control of the shapes of the microlenses (lenticular lenses) becomes relatively easy.

Figure 11:
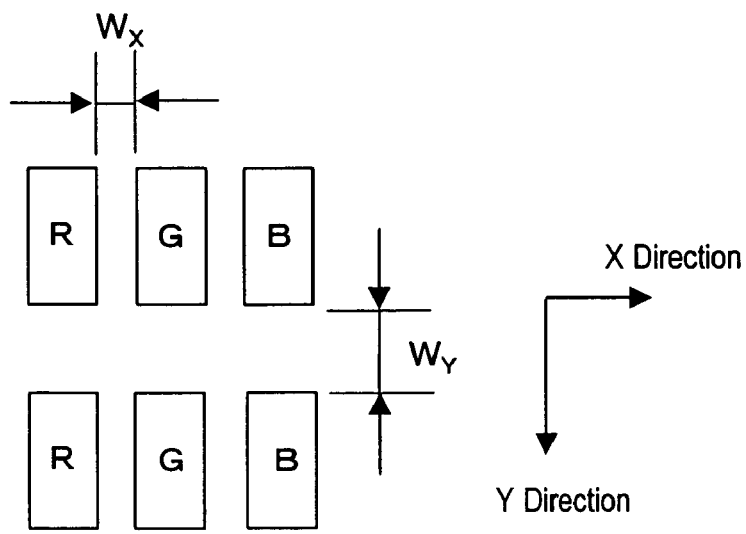
[FIG. 11] A schematic diagram showing an exemplary pixel arrangement for a liquid crystal display panel having a microlens array according to an embodiment of the present invention.

If lenticular lenses 107 are used, no converging effects are obtained along the direction in which the color filters are arrayed (X direction), and therefore the brightness improvement effects of the microlenses are reduced. However, usually in a liquid crystal display panel, as shown in FIG. 11, an interval ($W_Y$) between adjoining pixels along the column direction (i.e., the direction along which the source buses line (video lines) extend) is wider than an interval $W_X$ between adjoining pixels (and picture elements) along the row direction (X direction). In other words, higher brightness improvement effects can be obtained by using lenses which have converging effects along the Y direction than by using lenses having converging effects along the X direction. Thus, the decrease in the brightness improving effects associated with the lack of converging effects along the X direction is small.

Figure 12:
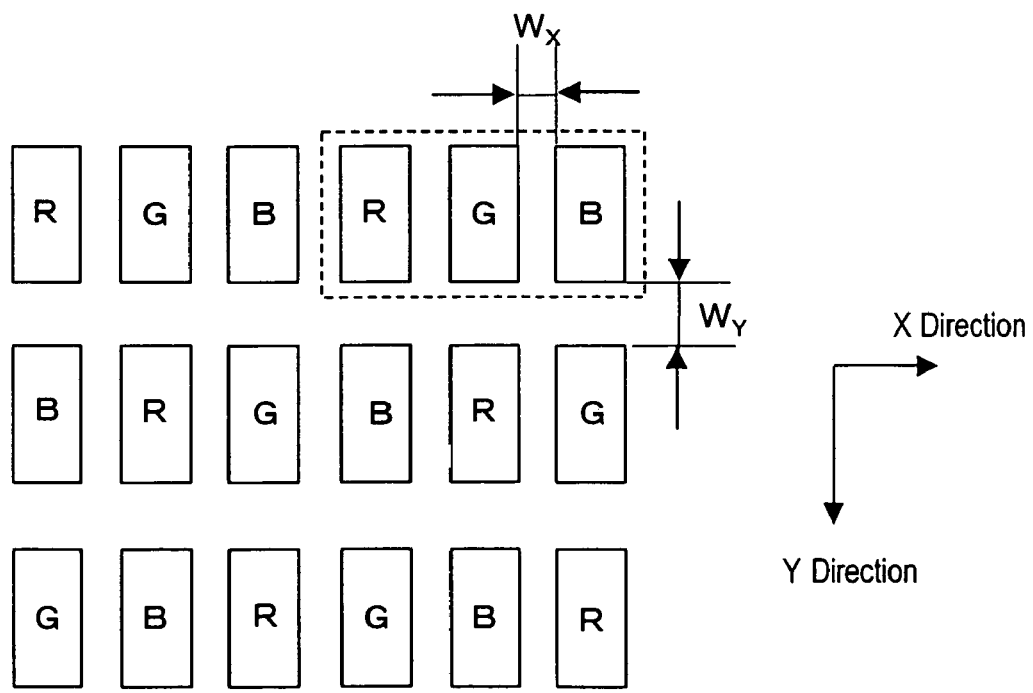
[FIG. 12] A schematic diagram showing another exemplary pixel arrangement for a liquid crystal display panel having a microlens array according to an embodiment of the present invention.

In the case of using microlenses which have converging effects only along one direction, the color arrangement of color filters is not limited to the stripe arrangement shown in FIG. 11. In an oblique arrangement as shown in FIG. 12, for example, it would be preferable that the direction along which the microlenses have converging effects is the column direction (video line direction) of the display panel, for the same reason as above.

It will be appreciated that, according to an embodiment of the present invention, it is also possible to produce a liquid crystal display panel which includes microlenses having converging effects along the X direction and along the Y direction, without being limited to lenticular lenses having converging effects only along one direction.

Figure 13:
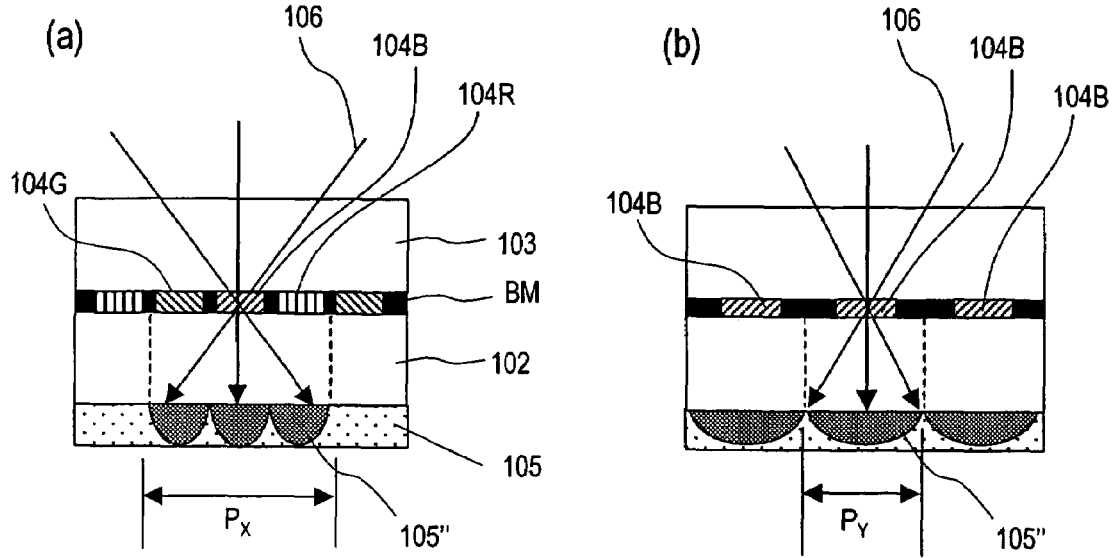
[FIG. 13](a) and (b) are schematic diagrams for describing another microlens construction and exposure process for a liquid crystal display panel having a microlens array according to an embodiment of the present invention.

For example, as schematically shown in FIG. 13(*a*) and (*b*), by using light which has been transmitted through the blue picture elements 104B and adjusting the scanning speed and light distribution of the exposure irradiation light as described above, it is possible to form cured portions 105" each of which corresponds to a green picture element 104G, a blue picture element 104B, or a red picture element 104R, and has curvature along the X direction and along the Y direction. Thereafter, through a development process, there is obtained a microlens array in which microlenses (e.g., rectangular lenses), having converging effects along the X direction and along the Y direction, are formed so as to correspond to the respective picture elements.

Note that the exposure process may be performed before injecting a liquid crystal material into the liquid crystal display panel. In this case, however, the microlens array will be heated to e.g. one hundred and several dozen ° C. in a heat treatment process for aligning the liquid crystal material, following after the injection of the liquid crystal material. Therefore, as the photocurable resin, it is preferable to use a resin which will not undergo any changes (e.g., deformation or peeling) that affect the converging effects of the microlenses when a heat treatment is performed.

The above embodiment illustrates, as shown in FIG. 2A, an example of employing color filters such that the red color filters 104R and the green color filters 104G almost do not allow the light near 400 nm which is used as exposure irradiation light to be transmitted therethrough, while only the blue color filters 104B allow the light near 400 nm to be sufficiently transmitted therethrough. However, this is not a limitation.

Figure 14:
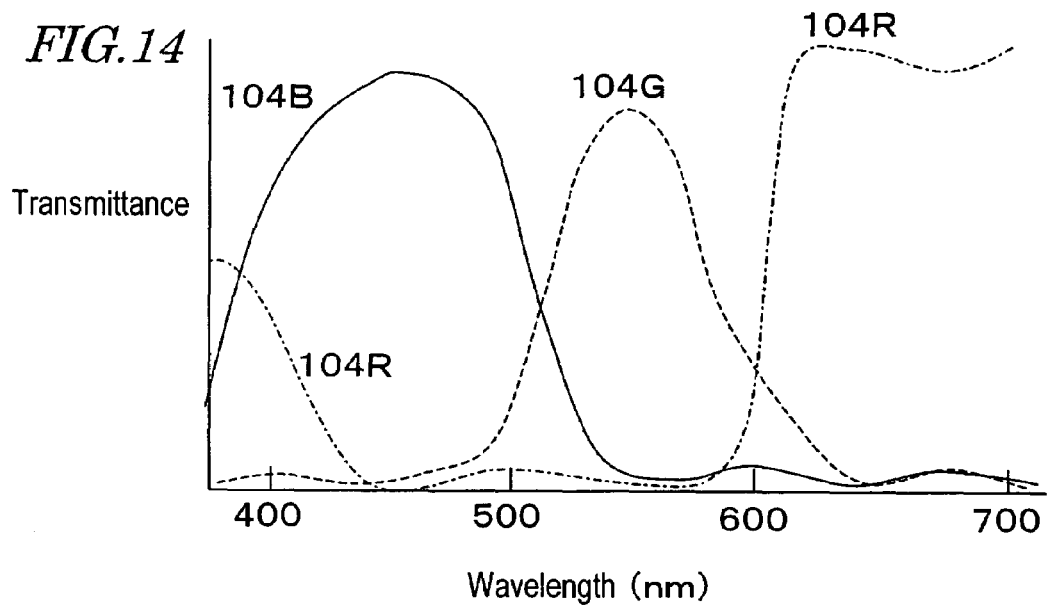
[FIG. 14] A graph showing the spectral transmittance characteristics of other color filters to be included in a liquid crystal display panel having a microlens array according to an embodiment of the present invention.

For example, also by using color filters having spectral transmittance characteristics as shown in FIG. 14, microlenses of predetermined shapes can be formed with the above-described method. In other words, in the case where the blue color filters 104B and the red color filters 104R transmit the exposure light near 400 nm, the scanning speed of the exposure illumination light may be adjusted and/or the light distribution of the illumination light may be adjusted by taking into consideration the transmittance of the blue color filters 104B and the red color filters 104R. Although FIG. 14 illustrates a case where color filters of two colors of blue and red transmit exposure light, the same will also be true for the two colors of blue and green, and will even be true for the case where all color filters of blue, green, and red transmit the exposure light.

Although a microlens array is formed on the TFT substrate 102 side in the above embodiment, it may instead be formed on the counter substrate 103 side. It will be appreciated that, without being limited to a TFT-type liquid crystal display device, a liquid crystal display device utilizing MIMs or a passive-type liquid crystal display device not including any switching elements may also be used.

Figure 15:
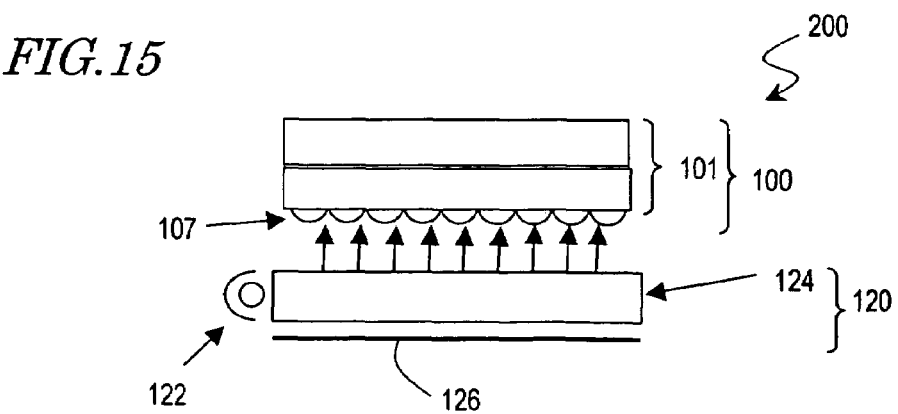
[FIG. 15] A diagram schematically showing the construction of a liquid crystal display device according to an embodiment of the present invention.

The liquid crystal display panel 100 having a microlens array which is obtained as described above is preferably used in combination with, for example, a backlight 120 having a high directivity, as is schematically shown in FIG. 15. By allowing highly directive light to enter the microlenses, a high converging efficiency can be obtained.

The liquid crystal display device 200 shown in FIG. 15 includes: a liquid crystal display panel 100 having microlenses 107; and a high-directivity backlight 120 which is disposed at the microlens 107 side of the liquid crystal panel 100. The backlight 120 includes: a light source 122; a light guiding plate 124 which receives light emitted from the light source 122, allows it to propagate therethrough, and emits it toward the liquid crystal display panel 100; and a reflector 126 which reflects the light emitted from the rear face of the light guiding plate 124 toward the light guiding plate 124. Note that FIG. 15 illustrates only the main elements, while omitting polarizing plates to be provided in front and at the back of the liquid crystal display panel 101, etc.

As a backlight to be suitably used for the liquid crystal display device 200, for example, backlights which are described in IDW'02 "Viewing Angle Control using Optical Microstructures on Light-Guide Plate for Illumination System of Mobile Transmissive LCD Module" K. KALANTAR p 549-552; Japanese Laid-Open Patent Publication No. 2003-35824; M. Shinohara, et al., Optical Society of American Annual Meeting Conference Program, Vol. 10, p. 189(1998); and Japanese National Publication No 8-511129 can be mentioned.

As described above, in a transflective liquid crystal display device, the regions through which light is transmitted (i.e., apertures of the picture elements) are smaller than those in a transmissive type, and therefore the decrease in the ratio of the area of the transmitting regions to the total area of the displaying region (i.e., the aperture ratio of the apertures of the picture elements) which is caused by reducing the pixel pitch would be more prominent than in a transmissive type. Therefore, it can be said that the effect of improving the effective aperture ratio by using microlenses in a transflective liquid crystal display device is greater than in the case of a transmissive type. The apertures of picture elements of the liquid crystal display device according to the above embodiment would also correspond to the apertures of picture elements in a transflective liquid crystal display device. Note however that, although the aperture (transmitting region) in each picture element can be disposed in various manners in a transflective liquid crystal display device, in the case of using lenticular lenses extending along the row direction as described above, it would be preferable that the aperture (transmitting region) is disposed in such a manner that the openings between picture elements adjoining each other along the row direction (i.e., light-shielding regions (including reflecting regions) positioned between transmitting regions) become as narrow as possible.

Figure 16:
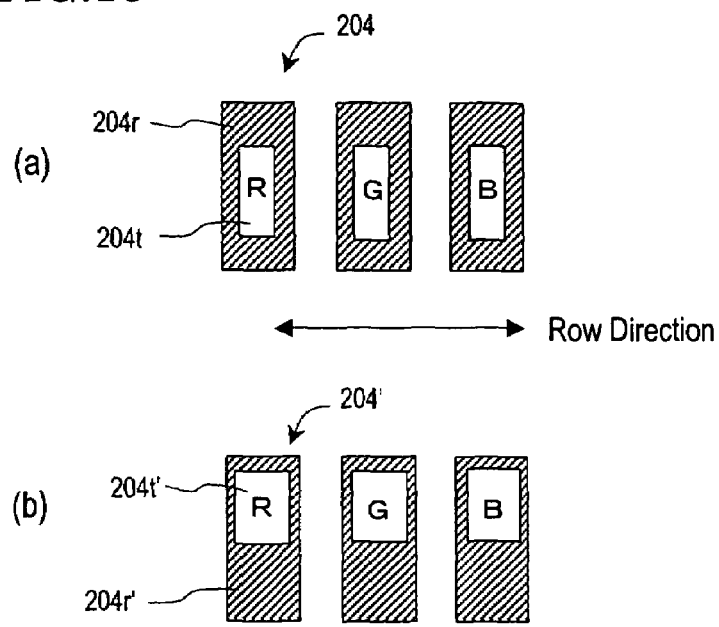
[FIG. 16](a) and (b) are schematic diagrams showing an exemplary arrangement of a transmitting region and a reflecting region in picture elements of a transflective liquid crystal display device according to an embodiment of the present invention.

For example, as exemplified by picture elements 204 schematically shown in FIG. 16(a), if a transmitting region (aperture of picture element) 204t is provided in a central portion of each picture element 204 and a reflecting region 204r is disposed around it, not only a source bus line but also the reflecting region 204r will exist between the transmitting regions 204t of adjoining picture elements, thus resulting in a wide interval (width of the light-shielding region) between the adjoining transmitting regions 204t. On the other hand, as schematically shown in FIG. 16(b), it is preferable not to provide a reflecting region 204r' around a transmitting region 204t' because the width of the light-shielding region between adjoining transmitting regions 204t' can be made narrow. Note that the transmitting region is typically defined by a transparent pixel electrode formed on the TFT substrate, whereas the reflecting region is defined by a reflecting pixel electrode.

Although the above embodiment employs a liquid crystal display panel having color filters, this is not a limitation. For example, a display device which performs color displaying by using a dye or the like that is mixed in the display medium layer (liquid crystal layer), e.g., a guest-host liquid crystal display device, would similarly be applicable. Furthermore, without being limited to liquid crystal display panels, any other non-self-emitting type display panel (e.g., an electrochromic display panel, an electrophoresis-type display panel, a toner display panel, or a PLZT panel) would also be applicable.

Moreover, by providing a flat portion in the apex portion of each microlens used in the liquid crystal display device of the above embodiment, the brightness improving effects by the microlenses can be further enhanced.

Figure 3:
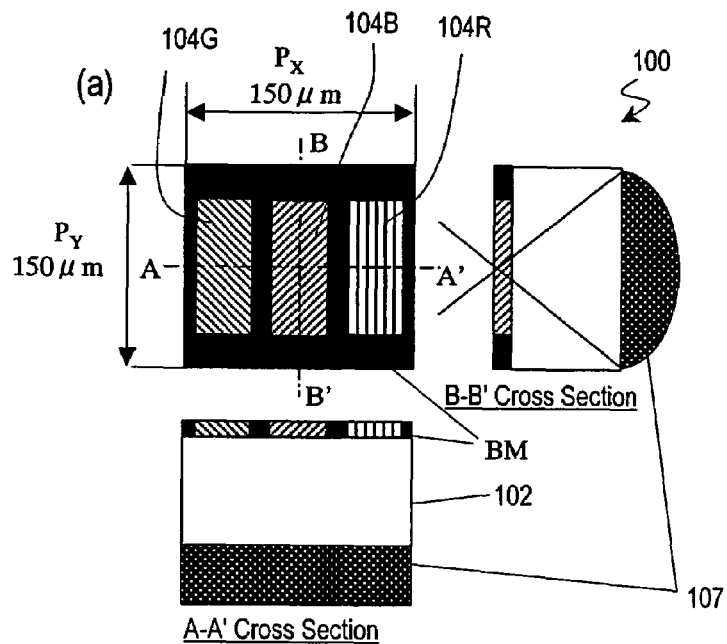
[FIG. 3](a) to (c) are schematic diagrams for describing a microlens construction and an exposure process for the liquid crystal display panel 100 having a microlens array according to an embodiment of the present invention.
Figure 3:
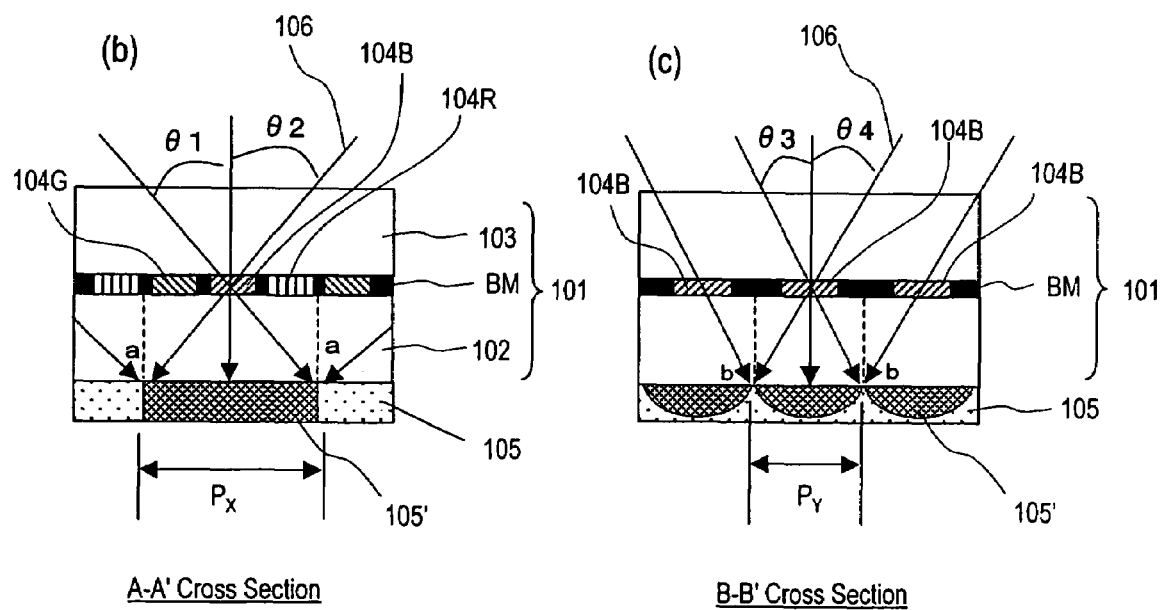
Figure 17:
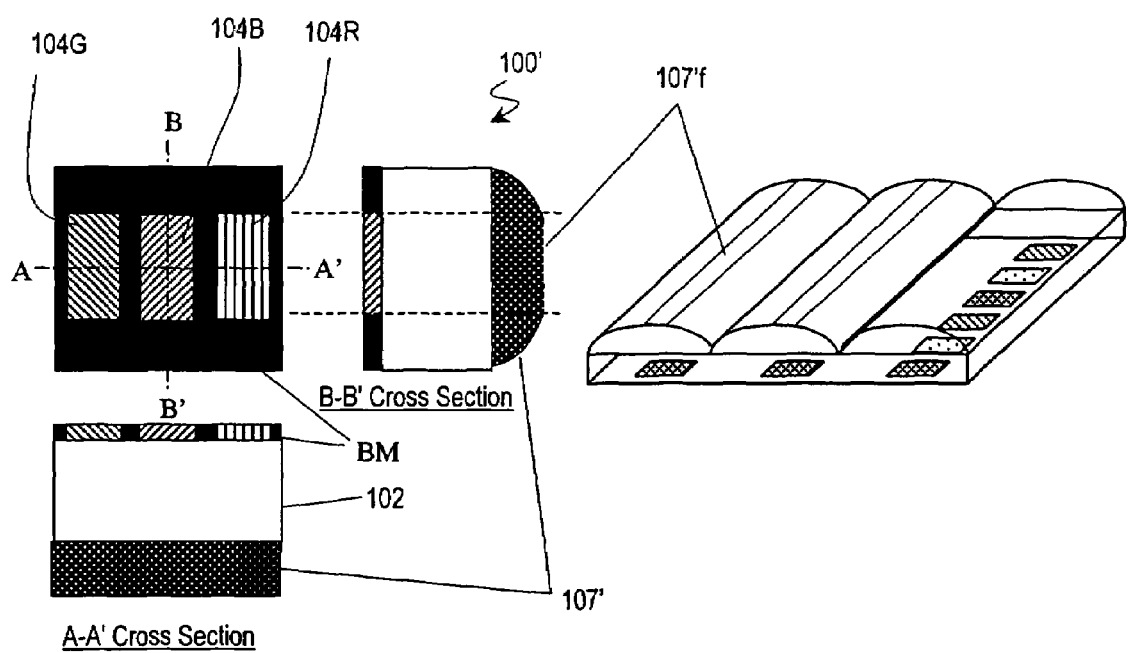
[FIG. 17] A diagram schematically showing a microlens construction for a liquid crystal display panel having a microlens array according to another embodiment of the present invention.

For example, a display panel 100' having a microlens array shown in FIG. 17 includes microlenses 107' each having a flat portion 107'f on its apex portion, and therefore provides for a more enhanced frontal brightness over that of the display panel 100 having a microlens array shown in FIG. 3.

As shown in FIG. 17, in the case where the microlenses are lenticular lenses, it is preferable that each flat portion 107'f has substantially the same width as the width of each of the apertures of picture elements (104R, 104G, 104B) along the converging direction of the lenses. Of course, the width of each flat portion 107'f might also be smaller than the width of each of the apertures of picture elements (104R, 104G, 104B) along the converging direction of the lenses, but the effects obtained by providing the flat portions 107'f will be reduced. Again for simplicity, regions corresponding to the apertures (transmitting regions) of the respective picture elements are illustrated as picture elements 104R, 104G and 104B herein.

Figure 18:
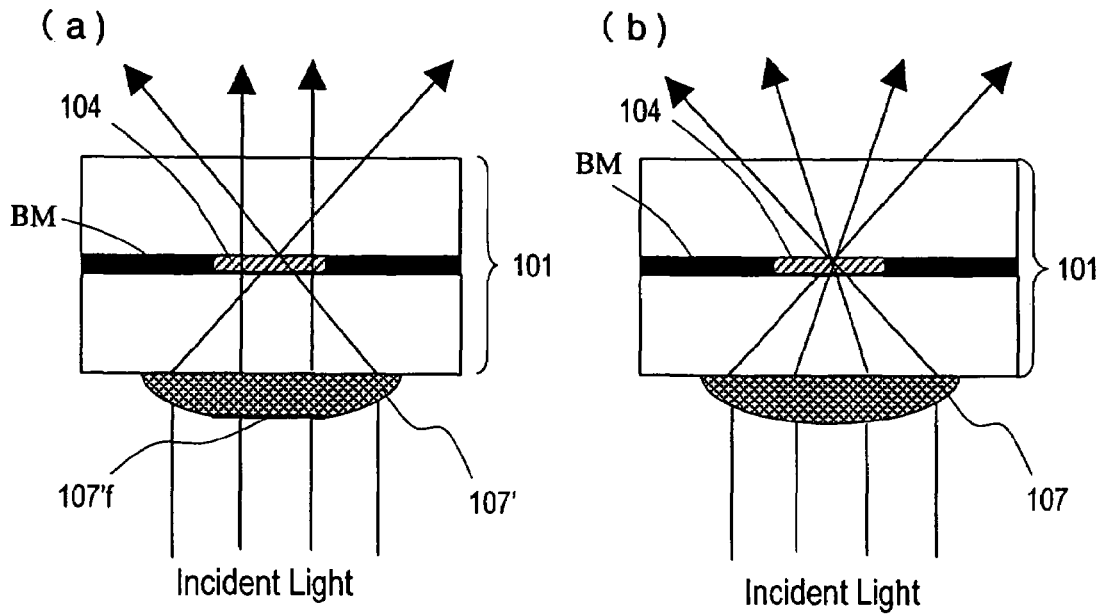
[FIG. 18](a) and (b) are schematic diagrams for describing the effects of providing a flat portion on a microlens, where (a) shows a direction of travel of light in the case where a flat portion is provided, and (b) shows a direction of travel of light in the case where no flat portion is provided.

When the microlenses 107' having such flat portions 107'f are used, the light which has traveled through the flat portions 107'f passes through the apertures of picture elements as it is, without being deflected by the microlenses 107', as shown in FIG. 18(a). Therefore, a high frontal brightness can be obtained by using high-directivity backlight having a high frontal brightness. On the other hand, light which enters any region other than the flat portions 107'f of the microlenses 107' (i.e., curved-surface portions of the microlenses 107') is refracted by the microlenses 107' so as to go through the apertures of picture elements. The efficiency of light utility is improved because the light entering the curved-surface portions of the microlenses 107' is the light which would be rejected by a BM and the like if the microlenses 107' were not provided.

On the other hand, when the microlenses 107 not having flat portions as shown in FIG. 3 are used, the efficiency of light utility will improve, but almost all of the light emitted from a high-directivity backlight (except for the light passing through the optical axis), having a high degree of parallelism, will be deflected by the microlenses 107 as shown in FIG. 18(b), and therefore the frontal brightness will slightly deteriorate. In other words, the effect of improving the frontal brightness by using a high-directivity backlight is reduced.

Figure 19:
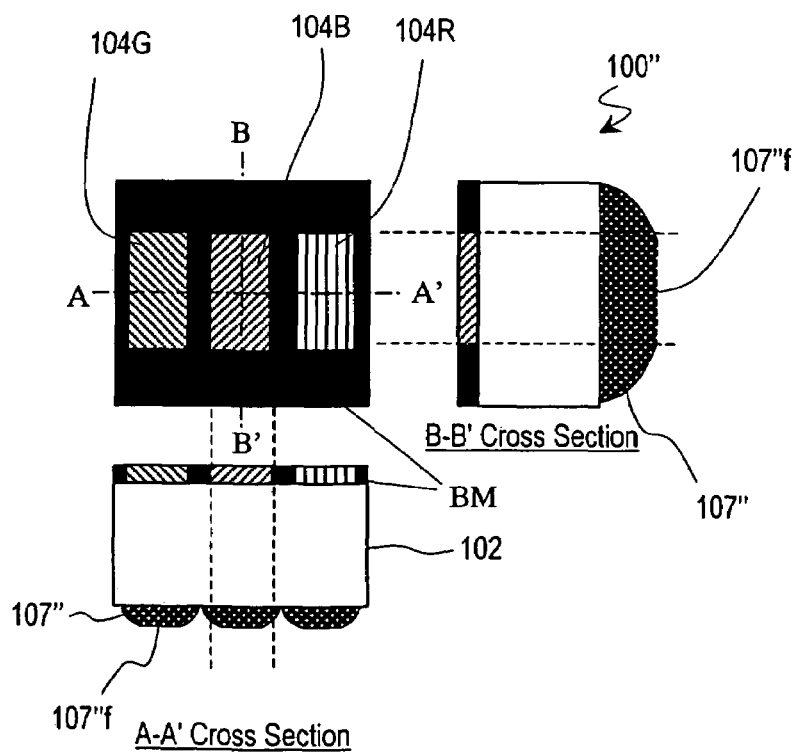
[FIG. 19] A diagram schematically showing a microlens construction for a liquid crystal display panel having a microlens array according to another embodiment of the present invention.
Figure 20:
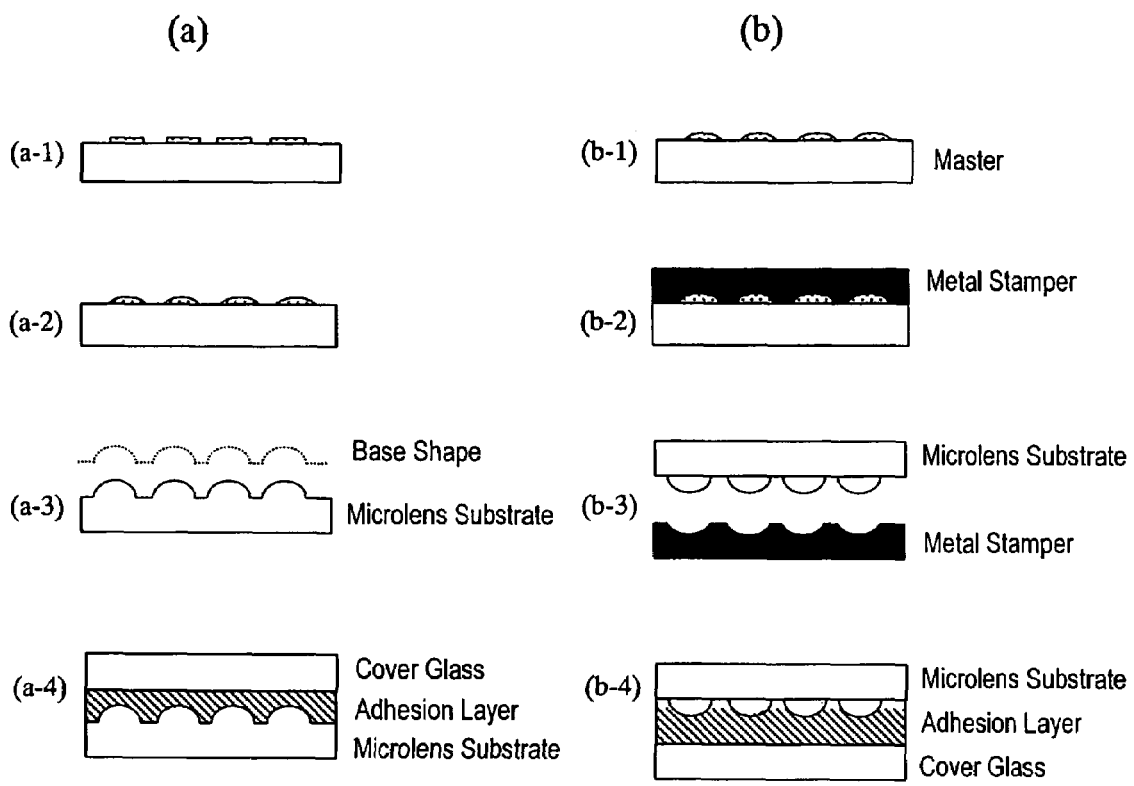
[FIG. 20](a) and (b) are schematic diagrams for describing a production method for conventional microlenses.

The effect of improving the frontal brightness by providing flat portions is not confined to the above example. For example, as exemplified by a display panel 100" having a microlens array shown in FIG. 19, flat portions 107"f may also be provided for microlenses 107" which are arranged so as to correspond to the respective picture elements of the display panel and have converging effects along both longitudinal and transverse directions. In this case, it is preferable that the sizes of the flat portions 107"f, both longitudinal and transverse, are substantially equal to the longitudinal and transverse sizes of the apertures of picture elements. By adopting such a construction, the effect which have been described with reference to FIGS. 18(a) and (b) can be obtained along both longitudinal and transverse directions. In this case, too, the width of each flat portion 107"f may be smaller than the width of each of the apertures of picture elements, although the effect will be reduced as described earlier.

INDUSTRIAL APPLICABILITY

According to the present invention, a microlens array is formed by utilizing light which has been transmitted through the apertures of picture elements (transmitting regions) of a display panel, and therefore microlenses are formed through self assembly. This results in an advantage in that mask alignment is unnecessary and the production process can be simplified, and also an advantage in that a high positioning accuracy between the microlenses and the apertures of picture elements is obtained.

According to the present invention, it is possible to improve the brightness and widen the viewing angle of a direct-viewing-type display device having a low physical pixel aperture ratio. For example, without narrowing the viewing angle of a transmissive or transflective type liquid crystal display device used as a display device of a mobile device, an improved brightness can be obtained. Especially by applying the present invention to a transflective liquid crystal display device having a low aperture ratio of transmitting regions, it becomes possible to obtain a high brightness while effectively realizing a wide viewing angle.

The invention claimed is:

1. A production method for a display panel having a microlens array, including a display panel and a plurality of microlenses provided on a light-incident side of the display panel, comprising:
    (a) a step of providing a display panel having a plurality of pixels in a matrix arrangement, wherein each of the plurality of pixels has a plurality of picture elements, including a first picture element transmitting first color light to display the first color and a second picture element transmitting second color light which is different from the first color light to display the second color;
    (b) a step of forming a photocurable material layer on one of a pair of outer principal faces, being opposite to each other, of the display panel;
    (c) a step of exposing the photocurable material layer to light via the display panel to form the microlens array, wherein the photocurable material layer is partially cured with light which has been transmitted through at least the first picture element; and
    (d) a step of removing an uncured portion of the photocurable material layer having been exposed to light, thereby forming a plurality of microlenses.

2. The production method of claim 1, wherein step (a) is a step of providing a display panel such that, among central wavelengths of any color light transmitted through the plurality of picture elements, a central wavelength of the first color light is the shortest wavelength.

3. The production method of claim 1, wherein step (b) is a step of forming a photocurable material layer which is photosensitive to light of shorter wavelengths than the central wavelength of the first color light.

4. The production method of claim 1, wherein step (c) comprises a step of at least partially curing, with light transmitted through the first picture element, the photocurable material layer corresponding to the plurality of picture elements included in each of the plurality of pixels; and
    step (d) comprises a step of forming a plurality of microlenses arranged in accordance with the arrangement of the plurality of pixels of the display panel.

5. The production method of claim 1, wherein step (a) is a step of providing a display panel such that each of the plurality of pixels has the first picture element in a substantial center thereof.

6. The production method of claim 1, wherein, step (a) is a step of providing a display panel such that the plurality of picture elements include a red picture element, a blue picture element, and a green picture element; and step (c) is a step of at least partially curing the photocurable material layer with light transmitted through at least the blue picture element.

7. The production method of claim 6, wherein step (b) is a step of forming a photocurable material layer which is photosensitive to light in a wavelength range of no less than 380 nm and no more than 420 nm.

8. The production method of claim 6, wherein step (c) comprises a step of at least partially curing, with light transmitted through at least the blue picture element, regions of the photocurable material layer corresponding to the red picture element, the blue picture element, and the green picture element.

9. The production method of claim 1, wherein step (c) comprises a step of adjusting a light distribution.

10. The production method of claim 9, wherein step (c) comprises a step of adjusting the light distribution by using a photomask having a predetermined distribution of transmittance.

11. The production method of claim 1, wherein the microlenses each have a flat portion in an apex portion thereof, the flat portion having no light converging effects.

12. The production method of claim 11, wherein the microlens are lenticular lenses, each flat portion having a size substantially equal to or smaller than a size of an aperture of each picture element of the display panel along a converging direction of the lenticular lenses.

13. The production method of claim 11, wherein the microlenses correspond to respective apertures of the plurality of picture elements of the display panel, each flat portion having a size substantially equal to or smaller than a size of an aperture of each picture element.

14. A production method for a display device, comprising:
a step of providing a display panel having a microlens array as produced by the production method of claim 1; and
a step of disposing a surface illuminant at the microlens side of the display panel.

15. A display device comprising:
a display panel having a microlens array as produced by the production method of claim 1; and
a surface illuminant for emitting light toward the microlens array of the display panel.

16. A production method for a display panel having a microlens array, including a display panel and a plurality of microlenses provided on a light-incident side of the display panel, comprising:
(a) a step of providing a display panel having a plurality of pixels in a matrix arrangement, wherein each of the plurality of pixels has a plurality of picture elements, including a first picture element transmitting first color light and a second picture element transmitting second color light which is different from the first color light;
(b) a step of forming a photocurable material layer on one of a pair of principal faces, being opposite to each other, of the display panel;
(c) a step of exposing the photocurable material layer to light via the display panel, wherein the photocurable material layer is at least partially cured with light which has been transmitted through at least the first picture element; and
(d) a step of removing an uncured portion of the photocurable material layer having been exposed to light, thereby forming a plurality of microlenses, wherein
step (c) comprises a step of performing exposure to substantially parallel light while varying an incident angle of the substantially parallel light with respect to the one principal face.

17. The production method of claim 16, wherein step (c) comprises a step of performing a scan with the substantially parallel light in such a manner that a plurality of lenticular lenses arranged corresponding to rows of the plurality of pixels in the matrix arrangement are formed.

18. The production method of claim 16, wherein step (c) comprises a step of performing a scan with the substantially parallel light in such a manner that a plurality of microlenses arranged corresponding respectively to the plurality of picture elements included in the plurality of pixels in the matrix arrangement are formed.

19. A production method for a display panel having a microlens array, including a display panel and a plurality of microlenses provided on a light-incident side of the display panel, comprising:
(a) a step of providing a display panel having a plurality of pixels in a matrix arrangement, wherein each of the plurality of pixels has a plurality of picture elements, including a first picture element transmitting first color light to display the first color and a second picture element transmitting second color light which is different from the first color light to display the second color;
(b) a step of forming a photocurable material layer on one of a pair of outer principal faces, being opposite to each other, of the display panel;
(c) a step of exposing the photocurable material layer to light via the display panel, wherein the photocurable material layer is partially cured with light which has been transmitted through at least the first picture element; and
(d) a step of removing an uncured portion of the photocurable material layer having been exposed to light, thereby forming a plurality of microlenses,
wherein
one of the first through third picture elements is a blue picture element transmitting blue light, and
the step of exposing the photocurable material layer to light via the display panel to at least partially cure the photocurable material layer includes having the light obliquely enter the photocurable material layer via each blue picture element.

* * * * *